(12) United States Patent
Pedrini

(10) Patent No.: US 12,459,316 B1
(45) Date of Patent: Nov. 4, 2025

(54) AUTOMATIC LOCKING FEATURE FOR A HITCH-MOUNTED EQUIPMENT CARRIER

(71) Applicant: Fabio Pedrini, Bologna (IT)

(72) Inventor: Fabio Pedrini, Bologna (IT)

( * ) Notice: Subject to any disclaimer, the term of this patent is extended or adjusted under 35 U.S.C. 154(b) by 329 days.

(21) Appl. No.: 17/978,324

(22) Filed: Nov. 1, 2022

Related U.S. Application Data

(60) Provisional application No. 63/275,001, filed on Nov. 3, 2021.

(51) Int. Cl.
*B60D 1/58* (2006.01)
*B60R 9/10* (2006.01)

(52) U.S. Cl.
CPC . *B60D 1/58* (2013.01); *B60R 9/10* (2013.01)

(58) Field of Classification Search
CPC .............. B60R 9/10; B60D 1/58; B60D 1/00
See application file for complete search history.

(56) References Cited

U.S. PATENT DOCUMENTS

| | | | |
|---|---|---|---|
| 5,244,133 A | 9/1993 | Abbott et al. | |
| 5,370,285 A * | 12/1994 | Steelman | B62D 43/02 224/521 |
| 5,690,260 A * | 11/1997 | Aikins | B60R 9/10 224/532 |
| 5,988,667 A | 11/1999 | Young | |
| 6,105,989 A | 8/2000 | Linger | |
| 6,131,938 A | 10/2000 | Speer | |
| 6,357,780 B1 | 3/2002 | Young | |
| 6,382,656 B1 | 5/2002 | Johnson, Jr. | |
| 6,835,021 B1 | 12/2004 | McMillan | |
| 6,951,287 B1 | 10/2005 | Randazzo | |
| 6,974,147 B1 | 12/2005 | Kolda | |
| 8,696,011 B2 * | 4/2014 | Despres | B60D 1/241 280/495 |
| 10,214,152 B1 | 2/2019 | Bass et al. | |
| 10,793,079 B1 * | 10/2020 | Shen | B60D 1/241 |
| 11,427,045 B2 | 8/2022 | Bowles et al. | |
| 11,772,569 B2 * | 10/2023 | Huang | F16B 2/20 224/519 |
| 2010/0283225 A1 | 11/2010 | Lahn | |
| 2014/0246467 A1 * | 9/2014 | Hein | B60R 9/06 224/400 |
| 2019/0389394 A1 * | 12/2019 | Viklund | B60R 9/10 |
| 2019/0389395 A1 * | 12/2019 | Viklund | B60R 9/06 |
| 2022/0153205 A1 * | 5/2022 | Kuschmeader | B60R 9/06 |

* cited by examiner

*Primary Examiner* — Derek J Battisti
(74) *Attorney, Agent, or Firm* — Wong Meyer Smith & McConnell

(57) ABSTRACT

A mounting arrangement for hitch-mounted equipment carrier includes a mounting bar having a transversely movable locking member. An equipment carrier mounting portion is movably supported by the mounting bar for movement between an operative position and an inoperative position. An actuator moves the locking member to a locking position within the hitch receiver when the mounting portion is moved from the inoperative position toward the operative position. The actuator includes a biasing member that applies a biasing force on the locking member for engaging it with the hitch receiver. The equipment carrier mounting portion is movable from the operative position to a tilt position while the mounting bar is engaged within the passage of the hitch receiver by the locking member.

4 Claims, 21 Drawing Sheets

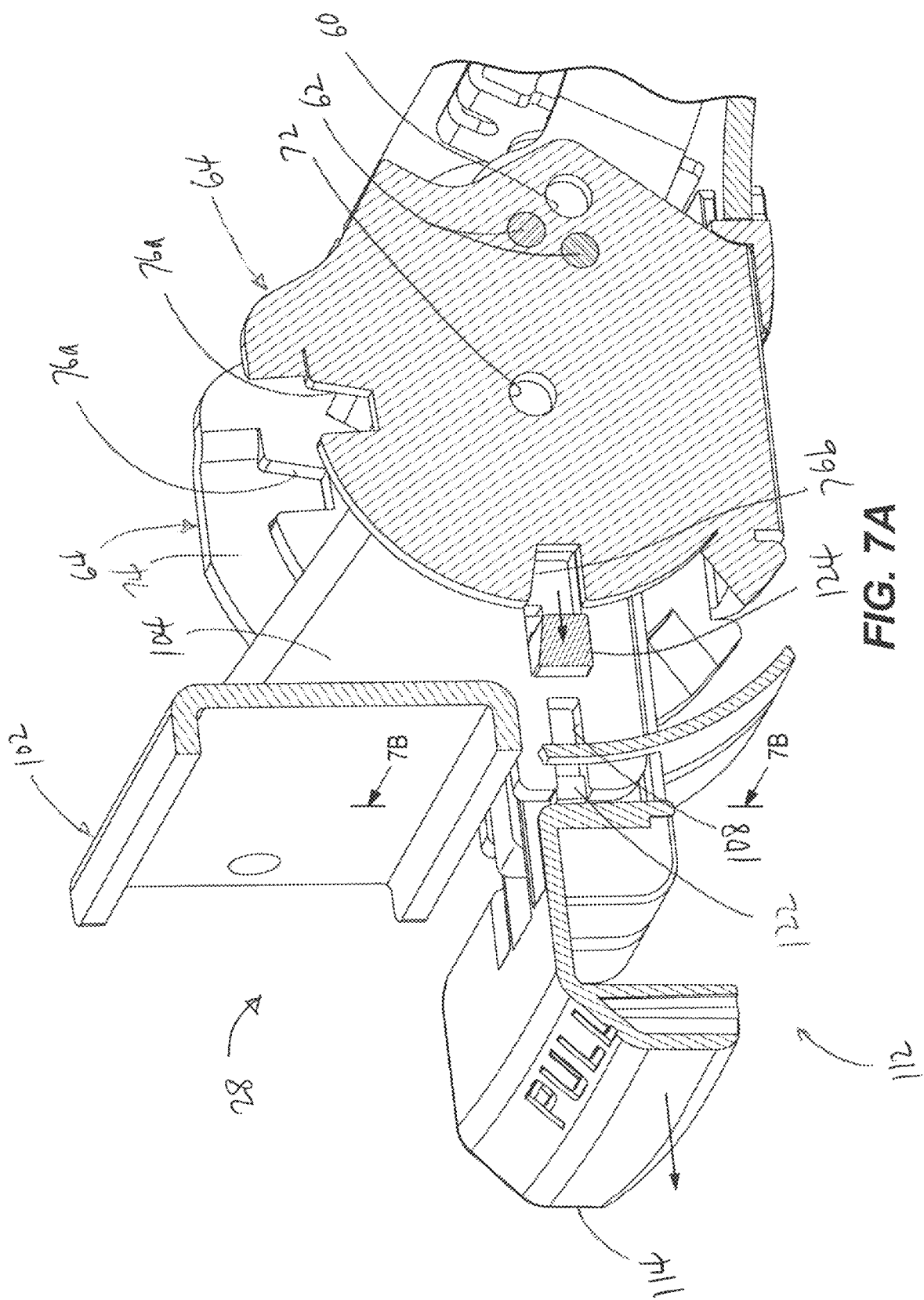

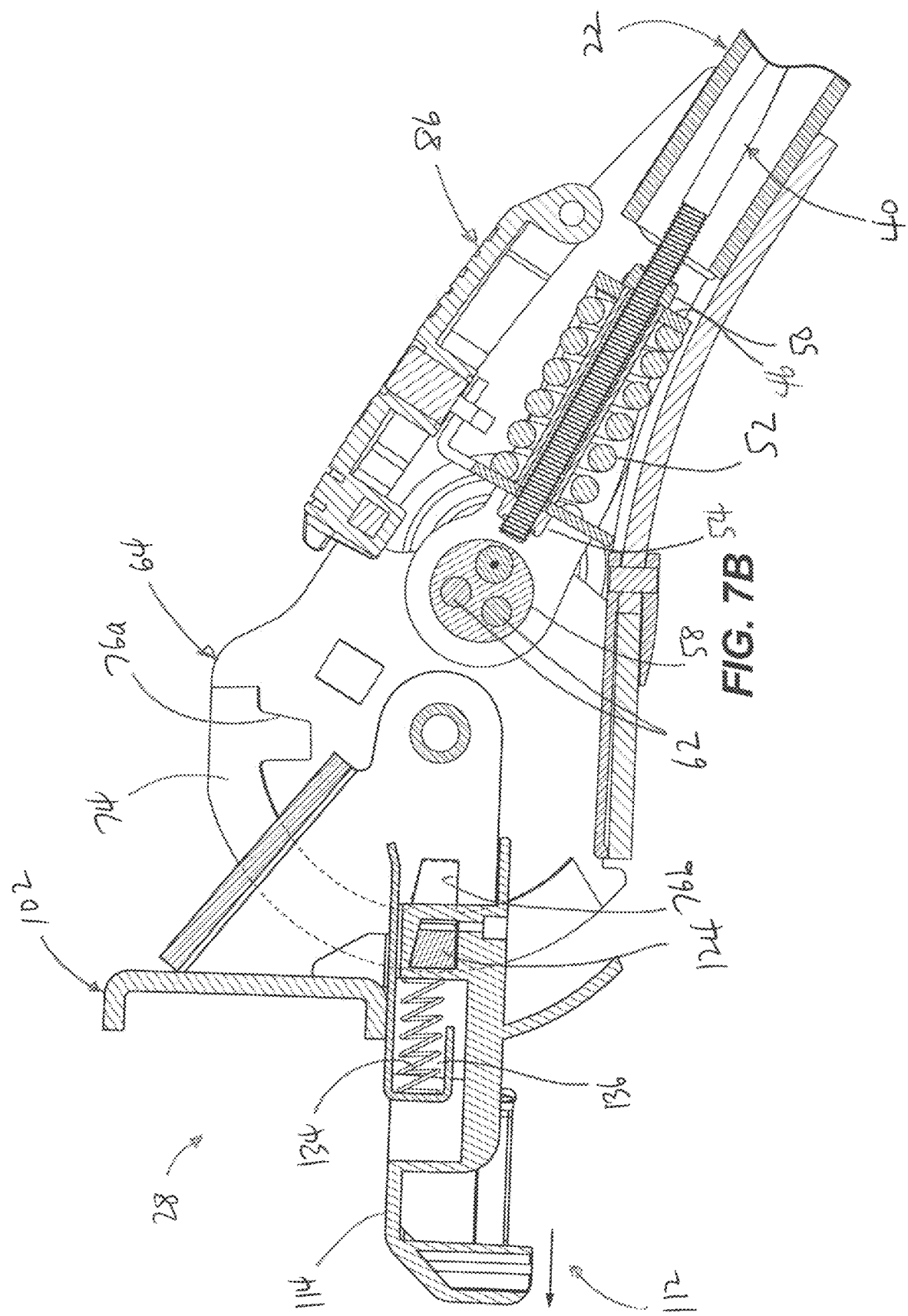

AUTOMATIC LOCKING FEATURE FOR A HITCH-MOUNTED EQUIPMENT CARRIER

This application claims the benefit of provisional application Ser. No. 63/275,001 filed Nov. 3, 2021, the entire contents of which are hereby incorporated by reference.

BACKGROUND AND SUMMARY

This invention relates to an equipment carrier for mounting to the hitch receiver of a vehicle, and more particularly to improvements in a hitch-mounted equipment carrier that is engaged with the hitch receiver when an equipment supporting portion of the equipment carrier is moved from an inoperative, release position to an operative, engaged position.

When a mounting bar of a hitch-mounted equipment carrier is received within the passage of a vehicle-mounted hitch receiver, there is inevitably some play between the hitch receiver and the mounting bar. Many different types of mechanisms or mounting arrangements have been developed to eliminate movement of the equipment carrier resulting from play between the hitch receiver in the mounting bar. Such mechanisms or mounting arrangements typically require the user to perform a manual operation after the mounting bar has been inserted into the hitch receiver passage, such as inserting and tightening a bolt, rotating a screw to advance a wedge, etc.

It is an object of the present invention to provide a hitch-mounted equipment carrier that can be quickly and easily mounted to a hitch receiver in a manner that eliminates play between the mounting bar and the hitch receiver, without the need for a manual operation of the type described above. It is a further object of the present invention to provide such a hitch-mounted equipment carrier that can be moved from an operative position toward a tilt position while remaining engaged with the hitch receiver of a vehicle.

In accordance with a first aspect of the present invention, mounting arrangement for an equipment carrier adapted to be secured to a vehicle-mounted hitch receiver having a series of walls defining an axially extending internal passage includes a mounting bar having a first end configured to be positioned within the internal passage of the hitch receiver and a locking member carried by the first end of the mounting bar and transversely movable relative to the mounting bar. An equipment carrier mounting portion is movably supported by a second end defined by the mounting bar, and is movable relative to the second end of the mounting bar between a first, operative position and a second, inoperative position. An actuator arrangement is interposed between the equipment carrier mounting portion and the locking member. The actuator arrangement is operable to move the locking member transversely relative to the mounting bar to a locking position, in which one or more engagement surfaces defined by the locking member engage one or more surfaces of the walls of the hitch receiver, when the equipment carrier mounting portion is moved from the second, inoperative position toward the first, operative position. The actuator arrangement includes a biasing member interconnected with the locking member and responsive to movement of the equipment carrier mounting portion toward the first, operative position to apply a biasing force on the locking member tending to move the locking member transversely to the locking position.

The equipment carrier mounting portion may be movable between the first, operative position and the second, inoperative position via a pivot connection between the equipment carrier mounting portion and the second end of the mounting bar, and the actuator arrangement may include a locking rod that is interconnected with the locking member, such that axial movement of the locking rod causes transverse movement of the locking member relative to the first end of the mounting bar. Representatively, the locking member may be in the form of a wedge member, and the first end of the mounting bar may include a wedge opening within which the wedge member is received, such that the wedge member and the wedge opening cooperate to move the wedge member transversely in response to axial movement of the locking rod. A camming arrangement may be incorporated in the actuator arrangement to move the locking rod axially movable in response to movement of the equipment carrier mounting portion toward the first, operative position. The locking rod defines spaced apart first and second ends, with the first end being interconnected with the locking member and the second end being interconnected with the camming arrangement. The biasing member may be in the form of a spring interposed between the camming arrangement and the second end of the locking rod.

This aspect of the present invention further contemplates a method of locking an equipment carrier to a vehicle-mounted hitch receiver, substantially in accordance with the foregoing summary.

In accordance with another aspect of the present invention, an equipment carrier adapted to be secured to a vehicle-mounted hitch receiver having a series of walls defining an axially extending internal passage includes a mounting bar having a first end configured to be positioned within the internal passage of the hitch receiver and a locking member carried by the first end of the mounting bar. An equipment carrier is pivotably interconnected with a second end of the mounting bar for movement about a main pivot axis, for movement between an inoperative position and an operative position. The locking member is operable to engage the mounting bar within the passage of the hitch receiver in response to movement of the equipment carrier from the inoperative position toward the operative position. An equipment carrying portion of the equipment carrier is movable from the operative position to a tilt position while the mounting bar is engaged within the passage of the hitch receiver by the locking member.

A retainer arrangement may be interposed between the mounting bar and the equipment carrier for selectively preventing pivoting movement of the equipment carrier about the main pivot axis. The equipment carrying portion of the equipment carrier may be pivotable about a second pivot axis spaced from the main pivot axis, and a latching arrangement associated with the equipment carrying portion is configured to selectively prevent pivoting movement of the equipment carrying portion about the second axis while permitting pivoting movement of the equipment carrier about the main pivot axis. The equipment carrying portion of the equipment carrier may be pivotable about the second pivot axis from the operative position to a tilt position in a first direction, and may be further pivotable about the second pivot axis from the operative position to a folded position in a second direction opposite the first direction.

Alternatively, the equipment carrying portion of the equipment carrier may be pivotable about the main pivot axis from the operative position to the tilt position.

This aspect of the present invention also contemplates a method of operating an equipment carrier, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which:

FIG. 7A is an enlarged partial section view of an equipment carrier mounting portion of the mounting arrangement of FIGS. 1-6, with reference to line 7A-7A of FIG. 2;

FIG. 7B is a partial section view taken along line 7B-7B of FIG. 7A;

Figure 1:
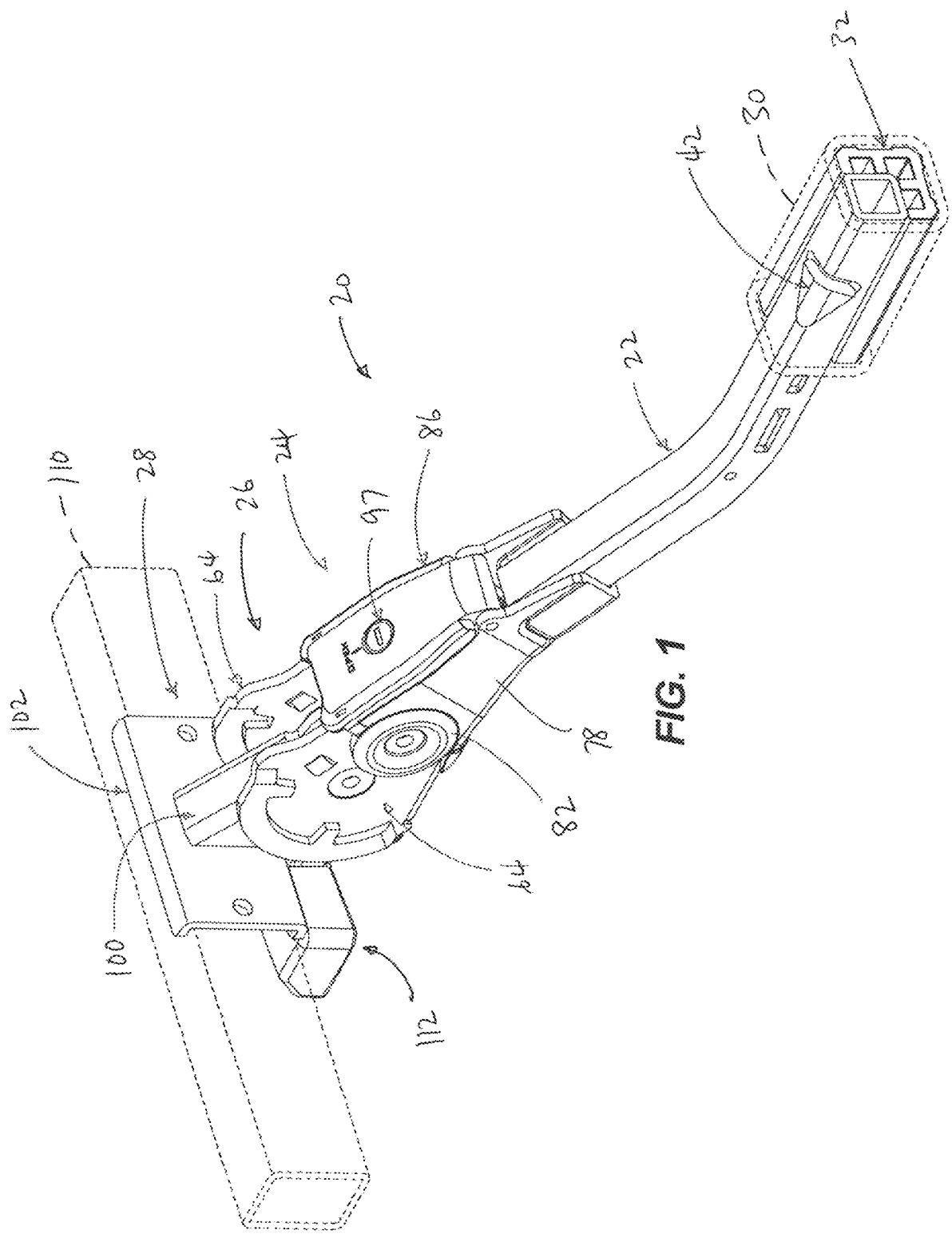
FIG. 1 is an isometric view of a first embodiment of a mounting arrangement for a hitch-mounted equipment carrier in accordance with the present invention.

In describing the embodiments of the invention which are illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art.

DETAILED DESCRIPTION

The various features and advantageous details of the subject matter disclosed herein are explained more fully with reference to the non-limiting embodiments described in detail in the following description.

Referring initially to FIG. 1, a mounting arrangement for a hitch-mounted equipment carrier is shown generally at 20. Generally, the mounting arrangement 20 includes a mounting bar 22, an actuator assembly 24, which includes a hub assembly 26, secured to the rearward end of mounting bar 22, and an equipment carrier mounting portion 28 interconnected with hub assembly 26. In a manner as is known, the forward end of the mounting bar 22 is configured to be inserted into a passage defined by a vehicle-mounted hitch receiver, shown in phantom at 30. The hitch receiver 30 illustrated in FIG. 1 has a passage larger than that of the forward end of mounting bar 22. In one configuration, the hitch receiver passage may have a relatively larger passage (such as 2" square), and the mounting bar 22 may have a relatively smaller cross-section (such as 1.25" square). In a configuration such as this, an adapter 32 is employed to fill the void area formed when the forward end of mounting bar 22 is inserted into the passage of hitch receiver 30. Alternatively, a hitch receiver having a cross-section corresponding to that of the forward end of mounting bar 22 may be employed such that the use of adapter 32 is unnecessary.

Referring to FIGS. 2-5, the actuator assembly 24 includes a housing 34 secured to the rearward end of mounting bar 22 and a lock assembly 36 having a rear operator assembly 38 contained within the actuator housing 34. A locking rod 40 extends forwardly from operator assembly 38. The locking rod 40 is interconnected with operator assembly 38 at its rearward end, and at its forward end is secured to a locking wedge 42.

The operator assembly 38 includes a bracket 44 having a front wall 46 and a pair of rearwardly extending sidewalls 48. A threaded nut 50 is located adjacent bracket front wall 46. The rear portion of locking rod 40 has threads which match those of nut 50, such that the axial position of locking rod 40 relative to bracket 44 can be adjusted by relative rotation between bracket 44 and locking rod 40. A spring 52 is positioned between bracket sidewalls 48 such that its forward end bears against the inside surface of bracket front wall 46. The threaded rear end of locking rod 40 extends through the interior of spring 52, and a nut 54 is engaged with the rear end of locking rod 40. A locking bracket 56 is positioned between the nut 54 and the rearward end of spring 52. Nuts 50, 54 can be rotated on the threaded rear portion of locking rod 40 to set the spring force of spring 52.

A block 58 extends between the rearward ends of bracket sidewalls 48, rearwardly of nut 54. The block 58 defines a series of transverse passages, including a front passage 60 and a pair of passages located rearwardly of front passage 60, within which a pair of camming pins 62 are received. The camming pins 62 have end portions that extend outwardly from the sides of block 58. The block 58 has a circular cross-section, and the ends of block 58 are positioned within circular openings formed in bracket sidewalls 48. In this manner, block 58 is rotatable relative to bracket 44.

The hub assembly 26 is formed with a pair of mirror image sidewalls 64 and a bottom wall 66. Each hub sidewall 64 is provided with a series of openings at its forward end. The hub sidewall openings include a front opening 68 and a pair of rear openings 70. The front openings 68 are adapted to align with front passage 60 in block 58, and the rear openings 70 are configured so as to enable the end portions of camming pins 62 to extend therethrough. Each hub sidewall 64 also includes a central opening 72, as well as an arcuate offset guideway 74 at its rear end. Each guideway 74 includes an upper detent 76a and a lower detent 76b.

Actuator housing 34 defines a pair of side walls 78 and a bottom wall 80. At its rearward end, each sidewall 78 is formed with a hub section 82 within which a central opening 84 is formed. A retainer member 86 is pivotably mounted to the forward end of actuator housing 34. The retainer member 86 acts as a cover to selectively prevent access to the interior of actuator housing 34, in a manner to be explained. The retainer member 86 is pivotably mounted between the actuator housing sidewalls 78 via a pivot pin 88, which extends through a passage formed in a transverse boss 90 at the inner end of retainer member 86, and into aligned openings in the actuator housing sidewalls 78. Retainer member 86 further includes an outer transverse boss 92 at its outer end, which defines a transverse passage through which a locking bar 94 extends. The locking bar 94 has a length greater than that of outer boss 92, such that the end portions of locking bar 94 extend outwardly from the ends of outer transverse boss 92. Retainer member 86 also includes a lock receiver 96, which is formed integrally with and extends from a wall 98 defined by retainer member 86. A lock assembly 97 (FIG. 2), which includes a T-shaped locking member 99, is adapted to be mounted within a cavity defined by lock receiver 96.

Equipment carrier mounting portion 28 includes a bracket section 100 and a carrier mounting section 102. The bracket section 100 is provided with a pair of generally triangular bracket walls 104. A cylindrical receiver 106 extends between the forward ends of bracket walls 104, and defines a transverse passage that is aligned with an opening 107 formed in each of bracket walls 104. A slot 108 is formed in the lower area of each bracket wall 104 rearwardly of openings 107. The equipment carrier mounting portion 102 is adapted for engagement with an equipment carrier assembly. As shown in FIG. 1, the equipment carrier assembly may include a crossbar 110, which may be incorporated in a tray-type bicycle carrier having various components for engagement with a bicycle to support the bicycle in an upright orientation. Such components may be configured, for example, to engage the bicycle wheels to support it in an upright, transverse orientation relative to the vehicle to which the mounting arrangement 40 is secured. Alternatively, an upright member may be secured to a differently configured carrier mounting section 102, having various bicycle-supporting components at its upper end for carrying bicycles on a vehicle in a suspended manner. Any other satisfactory type of equipment supporting components may be employed, whether for supporting bicycles or any other items or equipment on the rear of a vehicle.

A rotation actuator assembly 112 is configured for engagement with equipment carrier mounting portion 28. The rotation actuator assembly 112 includes a rear handle portion 114 and a bottom wall 116 extending forwardly therefrom. A mounting portion 118 is located forwardly of handle portion 114 and above bottom wall 116. The mounting portion 118 defines a pair of side walls 120. A guide bar 122 extends between and protrudes outwardly from the sidewalls 120. Forwardly of guide bar 122, a retainer bar 124 extends between and protrudes outwardly of sidewalls 120. A pair of ears 126 extend upwardly from mounting portion 118.

In assembly, the rotation actuator assembly 112 is slidably secured to the equipment carrier mounting portion 48, with mounting portion 118 being positioned between the lower areas of bracket section sidewalls 104, and bottom wall 116 of rotation actuator assembly 112 being positioned against the lower edges defined by bracket sidewalls 104. The end portions of the guide bar 122 are disposed within the slot 108 in bracket section sidewalls 104. With this arrangement, the rotation actuator assembly 112 can be moved forwardly and rearwardly relative to equipment carrier mounting portion 28 between an engaged position and a disengaged position, within the limits of movement defined by engagement at the end portions of guide bar 122 with the ends of slot 108. A spring (shown at 134 in FIG. 7B) is engaged between the mounting portion 118 and the bracket section 100 for applying a biasing force tending to move rotation actuator assembly 112 toward its forward, engaged position. As shown in FIG. 7B, the spring 134 may be contained within a recess 136 defined by wall structure incorporated within bracket section.

Figure 5:
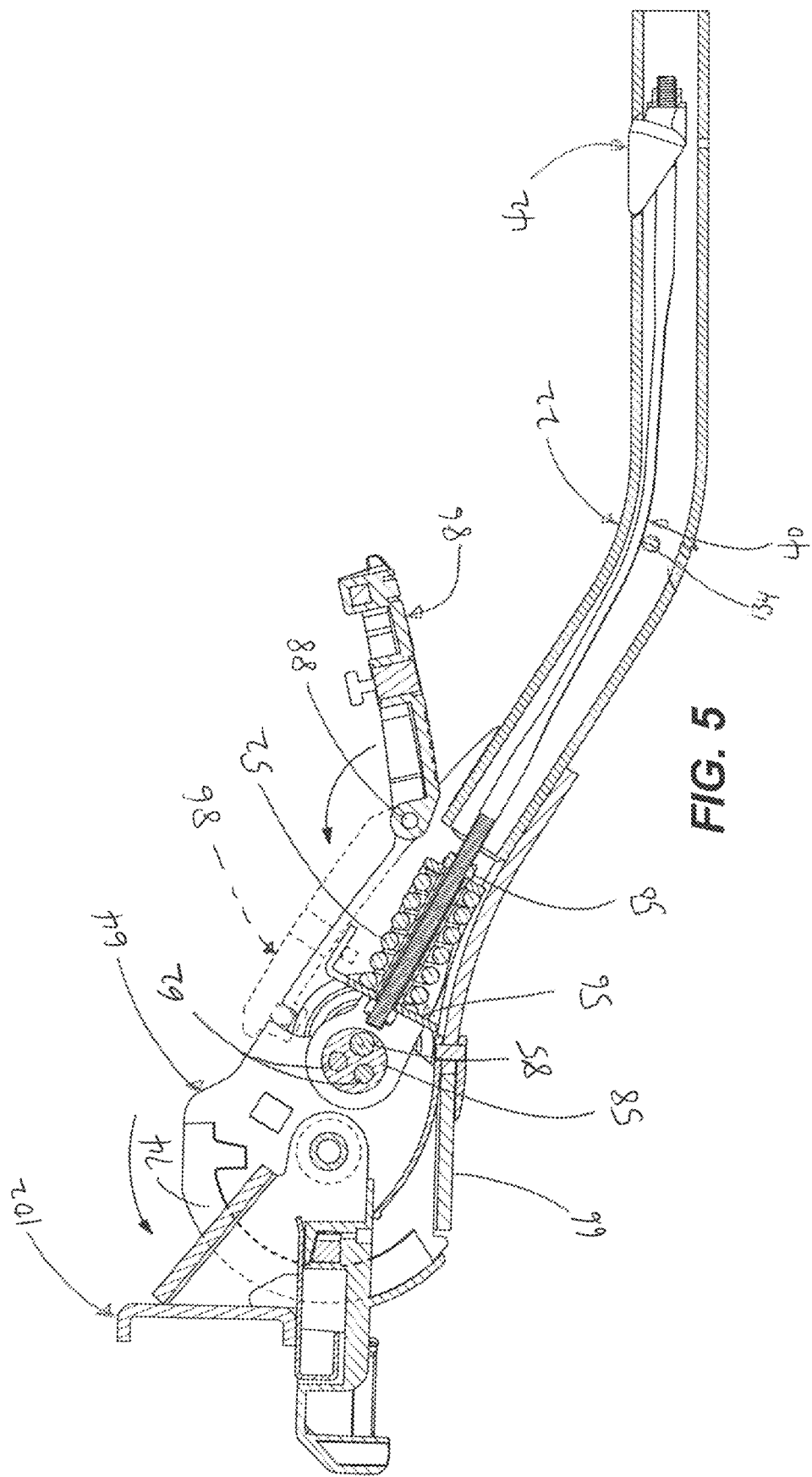
FIG. 5 is a section view similar to FIG. 4, illustrating the components of the mounting arrangement in an operative position.
Figure 6:
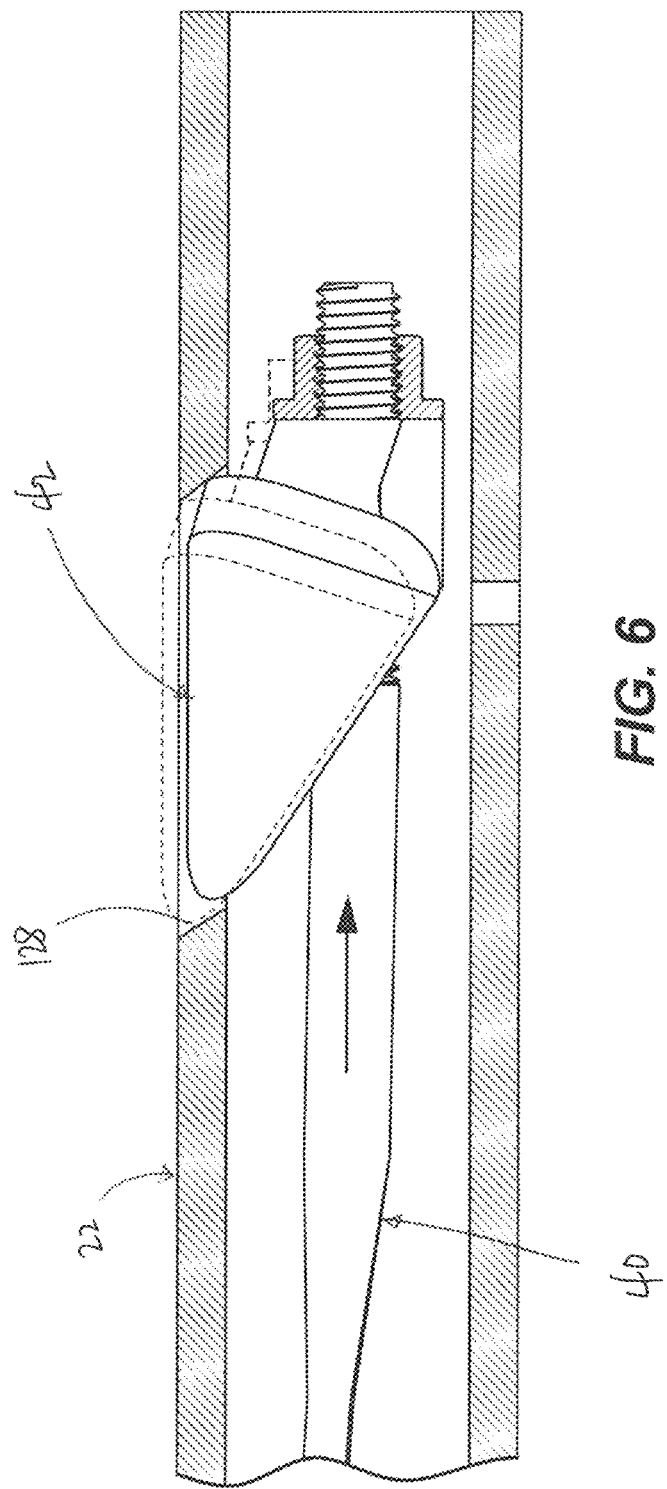
FIG. 6 is a partial section view with reference to line 6-6 of FIG. 4.

In overall assembly of mounting arrangement 20, the operator assembly 38 of lock assembly 36 is engaged with the hub assembly 26 such that the end portions of camming pins 62 are received within rear openings 70 in hub sidewalls 64. With operator assembly 38 so engaged with hub assembly 26, the front passage 60 in operator assembly block 58 is aligned with front openings 68 in hub sidewalls 64. As shown in FIG. 6, the locking wedge 42 is threadedly engaged with the threaded front end portion of locking rod 40, and the locking rod 40 of lock assembly 36 is inserted into the internal passage defined by mounting bar 22 such that the locking wedge 42 is positioned within a wedge-shaped cutout 128 formed in the walls of mounting bar 22. The hub assembly 26, with operator assembly 38 assembled thereto as described above, is positioned between the hub sections 82 at the rearward ends of housing sidewalls 78, such that the bracket front openings 68 and operator assembly block front passage 60 are aligned with central openings 84 in hub sections 82. A mounting bolt or the like (shown at 85 in FIGS. 4 and 5) is inserted through the openings 84, 68 and passage 60, so that the assembled hub assembly 26 and operator assembly 38 are pivotably mounted to housing 34 about a transverse pivot axis (shown at A1 in FIG. 1) defined by the mounting bolt. With this assembly, the longitudinal axis of block 58, shown at B1, is parallel to and offset from the transverse pivot axis A1. The equipment carrier mounting portion 28, with the rotation actuator assembly 112 assembled thereto as described above, is inserted between hub sidewalls 64 so that the openings 107 in bracket sidewalls 104, and the transverse passage of receiver 106, are aligned with the central openings 72 in hub sidewalls 64. A mounting bolt or the like (not shown) is inserted through the openings 72, 107 and the passage of receiver 106, so that the assembled equipment carrier mounting portion 28 and rotation actuator assembly 112 are pivotably mounted to bracket assembly 26 about a transverse pivot axis (shown at A2 in FIG. 1) defined by the mounting bolt. This construction thus provides dual parallel mounting axes, wherein hub assembly 26 and operator assembly 38 are pivotably mounted to actuator housing 34 about pivot axis A1, and equipment carrier mounting section 28 and rotation actuator assembly 112 are pivotably mounted to hub assembly 26 about pivot axis A2.

Figure 4:
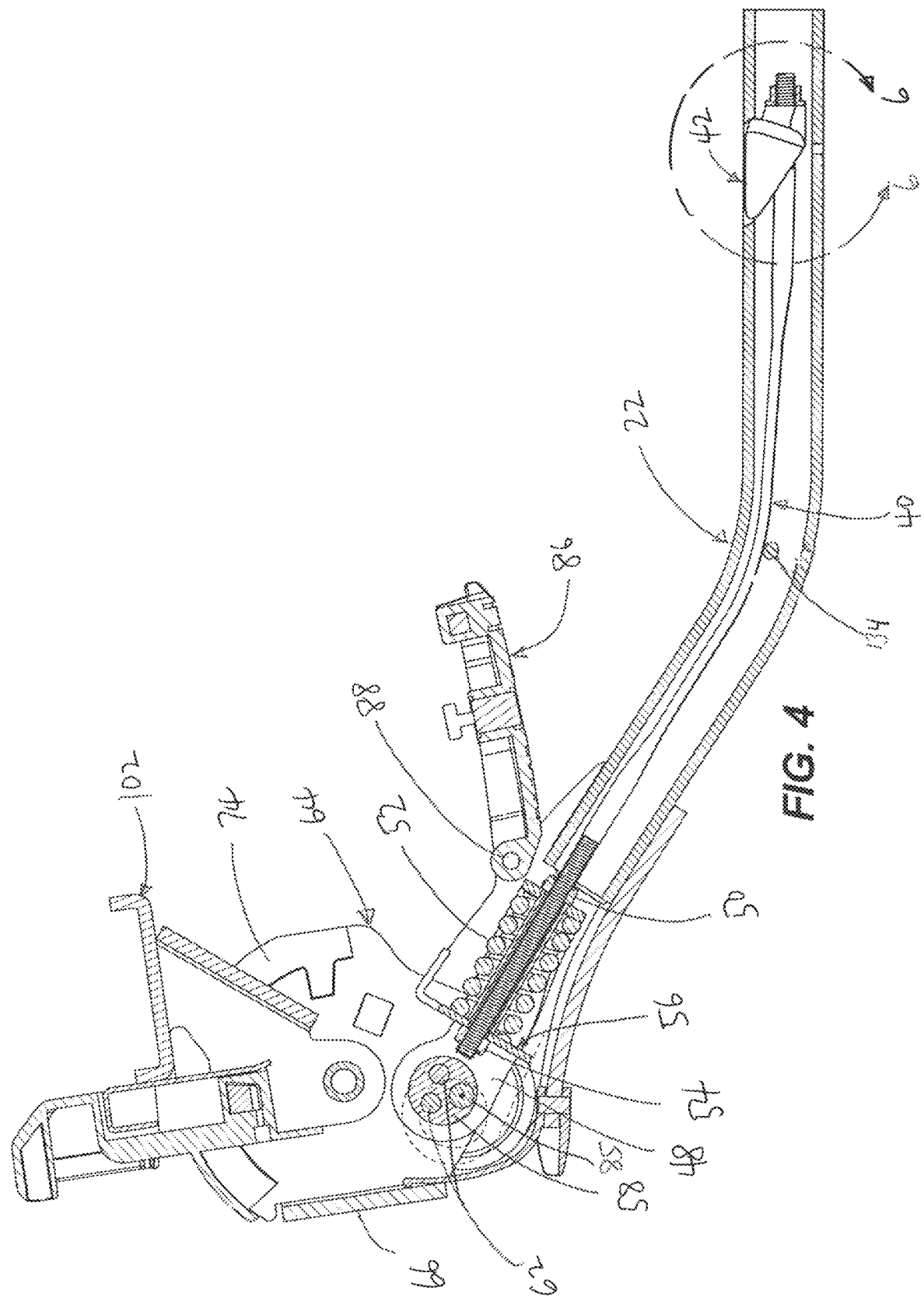
FIG. 4 is a section view with reference to line 4-4 of FIG. 2, illustrating the components of the mounting arrangement in an inoperative position.

In operation, equipment carrier mounting arrangement 20 is initially in an inoperative, folded position as shown in FIG. 4. To attain this position, the retainer member 86 of housing 34 is placed in the open or release position, which is shown in FIGS. 2-5. This position of retainer member 86 enables hub assembly 26 to be pivoted relative to housing 34. When mounting arrangement 20 is in the inoperative, folded position, the rotational position of block 58 relative to operator assembly bracket 44 places actuator housing 34 and locking rod 40 in a forward, retracted position due to the interaction between camming pins 62 and rear openings 70, within which camming pins 62 are received. In this position, locking wedge 42 is positioned forwardly in an unlocking position within wedge opening 128 in mounting bar 22. This position of locking wedge 42 is illustrated in solid lines in FIG. 6. Spring 52 has a tendency to extend, which biases hub assembly 26, and the various components mounted thereto, toward the inoperative, folded position.

Figure 2:
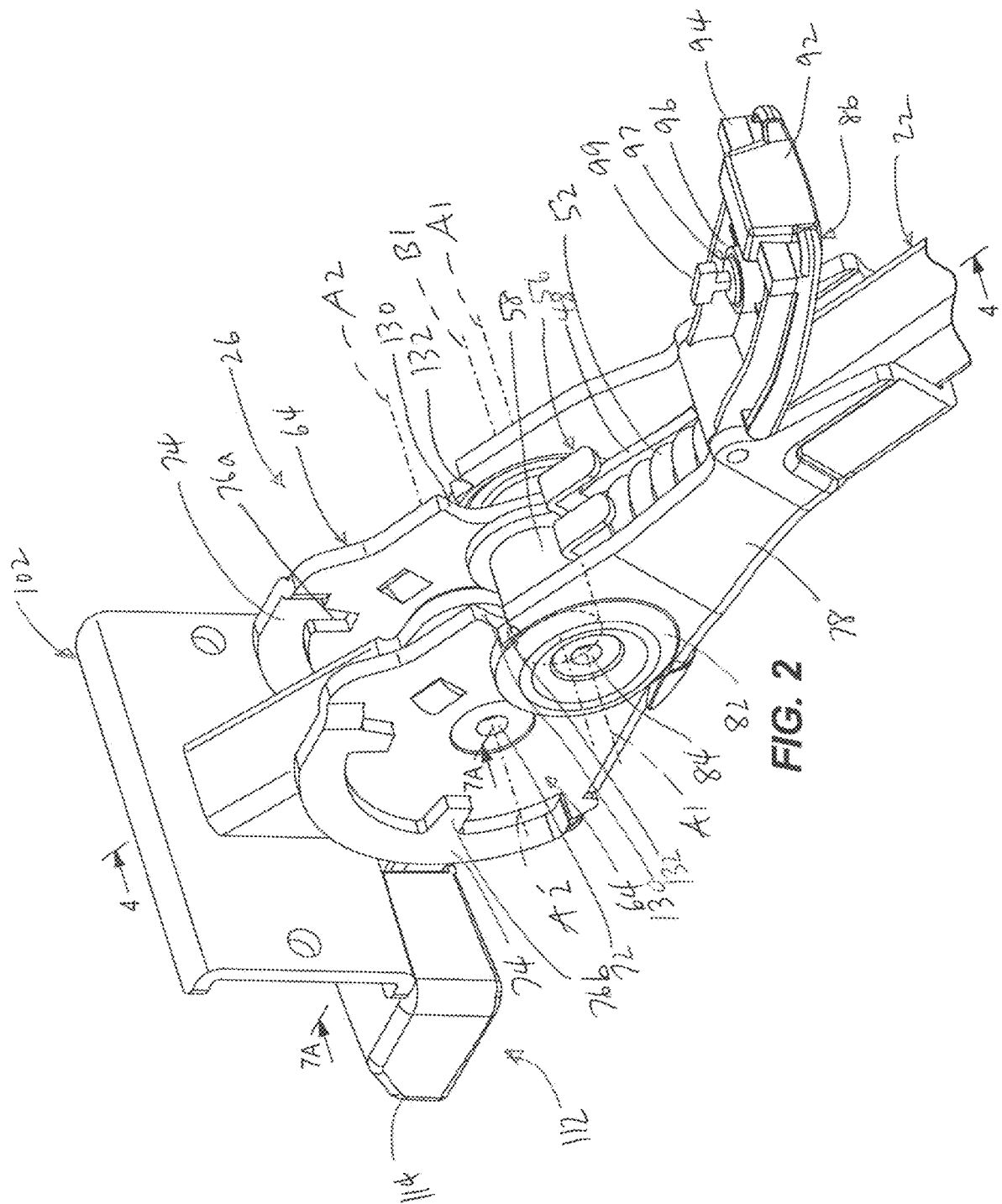
FIG. 2 is an enlarged partial isometric view showing a rear portion of the mounting arrangement of FIG. 1.
Figure 3:
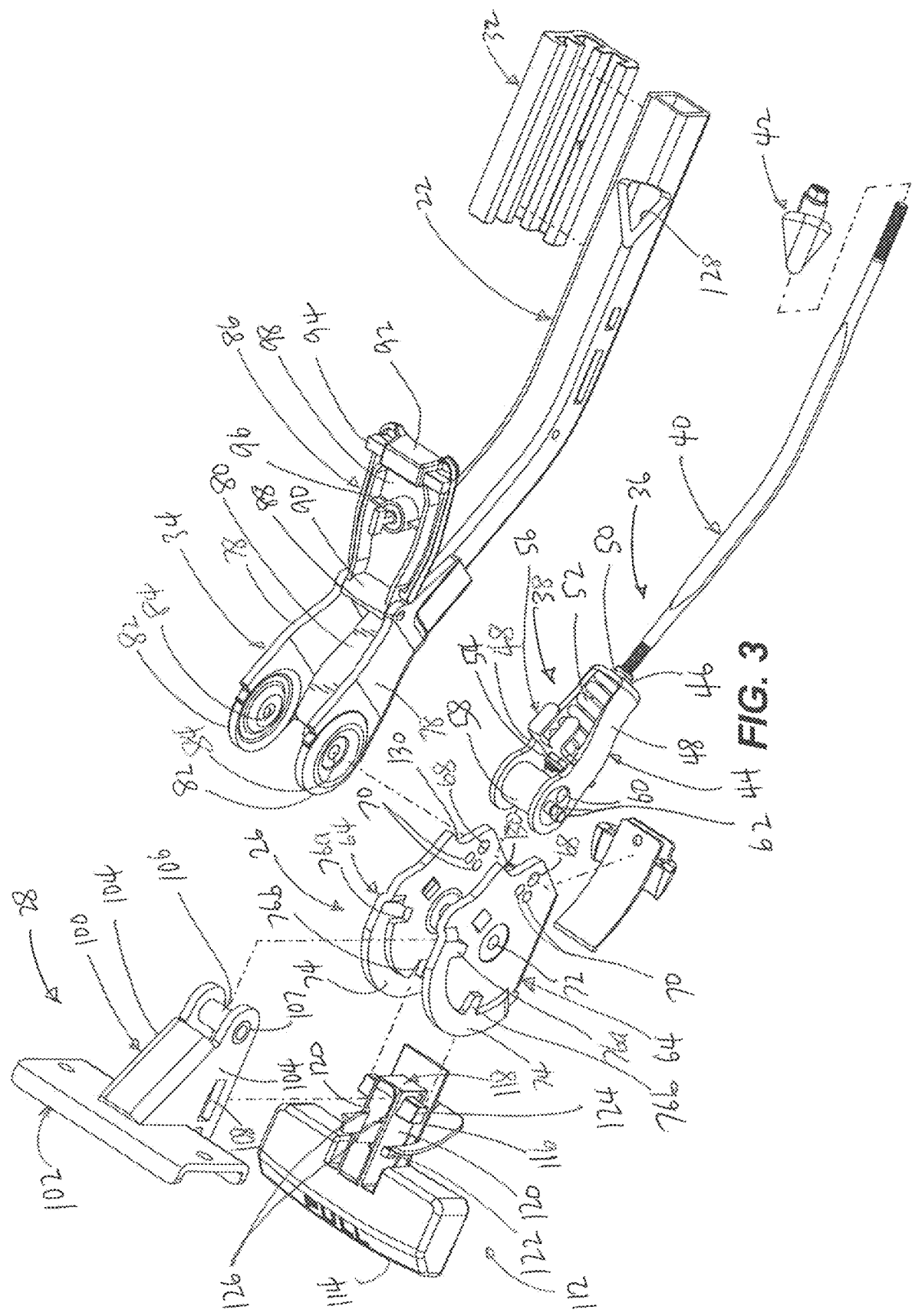
FIG. 3 is an exploded isometric view illustrating the components of the mounting arrangement of FIGS. 1 and 2.

With equipment carrier mounting arrangement 20 in the inoperative, folded position as shown in FIG. 4, the forward end of the mounting bar 22 can be inserted into the rearwardly open passage of the hitch receiver 30. The mounting bar 22 is inserted an amount sufficient to place the entirety of wedge opening 128 within the hitch receiver passage. With the forward end of mounting bar 22 positioned fully within the passage of the hitch receiver 30, the user applies a rearward and downward force on equipment carrier mounting portion 28, such as via carrier assembly crossbar 110, which force is transferred to hub assembly 26 so as to cause hub assembly 26 to pivot rearwardly and downwardly about the hub assembly pivot axis A1 (defined by mounting bolt 85) relative to actuator housing hub sections 82. Such movement results in the hub assembly 26, and components mounted thereto, being moved to a lowered, operative position as shown in FIGS. 1, 2 and 5.

Pivoting movement of hub assembly 26 downwardly and rearwardly as described above results in camming pins 62 also rotating block 58 downwardly and rearwardly (in a counterclockwise direction, as illustrated) within the openings of bracket sidewalls 48 about the pivot axis A1 of hub assembly 26. Such downward and rearward movement of block 58 causes pins 62 to draw operator assembly 38 rearwardly within housing 34, which results in rearward movement of locking rod 40 within the internal passage of mounting bar 22, and thereby rearward movement of locking wedge 42 within wedge opening 128 in mounting bar 22. Before hub assembly 26 is moved to its fully lowered position, locking rod 42 is moved rearwardly to a position in which the angled edges of wedge opening 128 move locking wedge 42 outwardly relative to the outer surfaces of mounting bar 22 (as shown in phantom in FIG. 6) and into engagement with the internal walls of hitch receiver 30. The user continues to rotate hub assembly 26 toward its fully lowered position against the force of spring 52, which continues to move operator assembly 38 rearwardly and thereby continues to draw locking rod 40 rearwardly within the internal passage of mounting bar 22. With the outer surfaces of locking wedge 42 being engaged with the internal walls of hitch receiver 30, locking wedge 42 cannot be further advanced within wedge opening 128, and such downward rotation of hub assembly 26 thus functions to apply a compressive force on spring 52 due to engagement of the rearward end of spring 52 with the end of locking rod 40 via locking bracket 56 and nut 54, and the forward end of spring 52 with the front wall 56 of operator bracket 44. Spring 52 is a heavy compression spring, such that any compressive force on it results in application of a significant tensile force on locking rod 40. The tensile force applied to locking rod 40 in this manner is transferred to locking wedge 42 which, via its engagement with the angled surfaces of wedge opening 128, applies outward forces on the inner walls of hitch receiver 30, thus forcing locking wedge 42 and the opposite surfaces of mounting bar 22 against the internal walls of hitch receiver 30. In this manner, when hub assembly 26 is pivoted fully downwardly, mounting bar 22 is locked against axial movement relative to hitch receiver 30 due to the wedge action of locking wedge 42. Spring 52 is sized so as to be capable of applying sufficient tensile force on locking rod 40 to enable wedge 42 to be moved into locking engagement with the inner walls of the hitch receiver 30, throughout the range of variability that may be encountered in the size of the hitch receiver passage within which mounting bar 22 is received. In this manner, it is normally unnecessary for a user to make any manual adjustments to accommodate variations in the size of the hitch receiver passage.

When hub assembly 26 has been fully lowered to its operative position as described above, a pair of retainer edges 130 defined by hub sidewalls 64 are adjacent to, and angularly offset from, a pair of retainer edges 132 defined by actuator hub sidewalls 78. In order to maintain the hub assembly 26 in the lowered, operative position, the user moves retainer member 86 from its open, inoperative position as shown in FIGS. 2-5 to its closed, locking position as shown in FIG. 1. When retainer member 86 is moved to the closed, locking position in this manner, the end portions of the locking bar 94 are positioned between and against the retainer edges 130 of hub sidewalls 64 and the retainer edges 132 of actuator housing sidewalls 78. The presence of locking bar 94 within the space between the retainer edges 130 and the retainer edges 132 prevents hub assembly 26 from being rotated relative to actuator housing 34, so that hub assembly 26 is maintained in its lowered, operative position with locking wedge 42 functioning to lock mounting bar 22 to hitch receiver 30.

Figure 8:
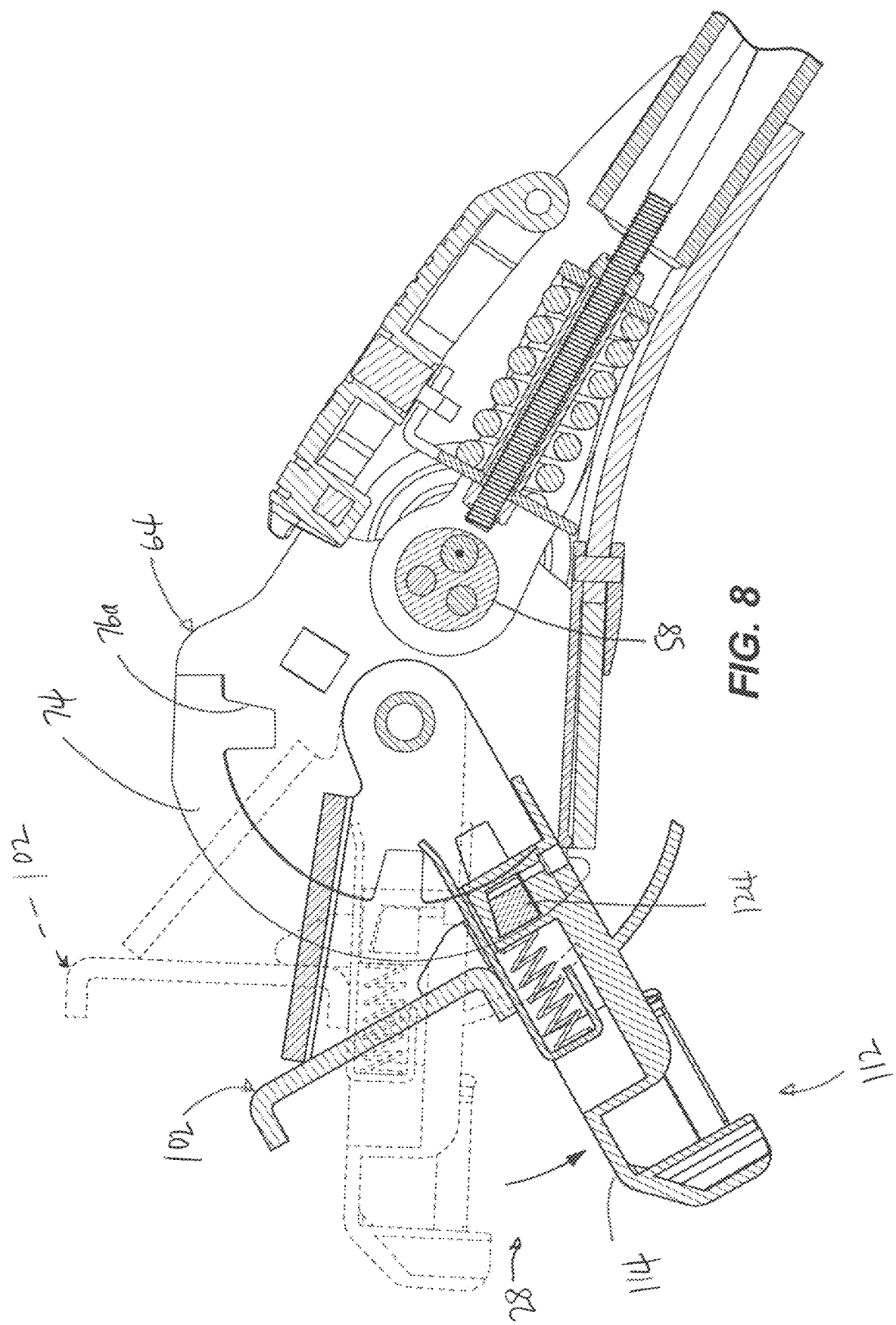
FIG. 8 is a partial section view similar to FIG. 7B, illustrating the equipment carrier mounting portion in a tilt position.
Figure 9:
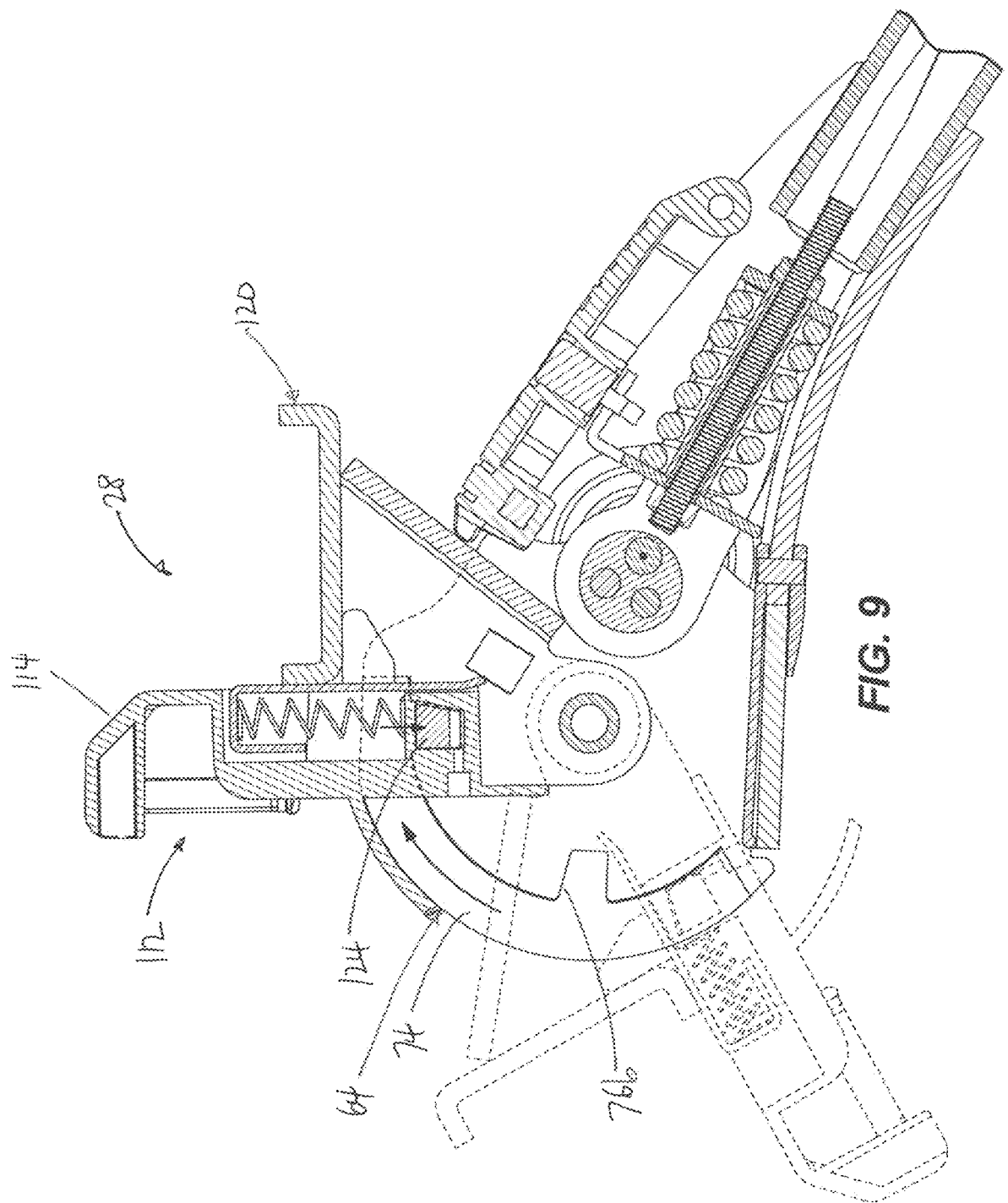
FIG. 9 is a partial section view similar to FIG. 8, illustrating the equipment carrier mounting portion in a storage position.

Once hub assembly 26 has been moved to, and locked in, its lowered, operative position as described above, the user is able to selectively rotate equipment carrier mounting portion 28 between various positions. Initially, when hub assembly 26 is rotated to its lowered, operative position, the equipment carrier mounting portion 28 is also in an operative position in which the equipment carrying components secured to equipment carrier mounting section 102 are in an operative position. In the case of a bicycle rack, for example, tray components supported by equipment carrier mounting section 102 are positioned so as to face upwardly to receive bicycle wheels so that one or more bicycles can be supported on such components for transport. In the event a user wishes to access the rear area of the vehicle, the user can utilize rotation actuator assembly 112 to enable the bracket section 100 of equipment carrier mounting portion 28 to be lowered to a tilt position, shown in FIG. 8. This is accomplished by manually moving rotation actuator assembly 112 rearwardly to its disengaged position as shown in FIGS. 7A and 7B, which moves guide bar 122 of rotation actuator assembly 112 rearwardly within slots 108 in bracket walls 104. This draws retainer bar 124 out of the detents 76b of raceways 74 defined by hub sidewalls 64, so that equipment carrier mounting portion 28 can pivot downwardly about the pivot mounting axis A2 between equipment carrier mounting portion 28 and hub assembly 26. Raceways 74 are configured such that the engagement of the retainer bar ends 124 with the lower ends of the raceways 74, as shown in FIG. 8, defines the lowermost extent of movement of equipment carrier mounting portion 28. When it is desired to return equipment carrier mounting portion 28 to its operative position, the user lifts upwardly so as to raise equipment carrier mounting portion 28. When the operative position of equipment carrier mounting portion 28 is reached, the forward biasing force on rotation actuator assembly 112 applied by spring 134 functions to force the ends of the retainer bar 124 into the detents 76b so as to again maintain the equipment carrier mounting portion 28 in the operative position.

If the user wishes to fold the equipment carrier mounting portion 28 to an upright, inoperative position, such as when the equipment carrier is not being used but the user wishes to maintain it in engagement with the vehicle, the user again moves rotation actuator assembly 112 rearwardly to the disengaged position so as to disengage the ends of retainer bar 124 from the detents 76b. The user can then apply an upward and forward rotational force on equipment carrier mounting portion 28 so as to rotate the equipment carrier mounting portion 28 upwardly and forwardly relative to hub assembly 26 about the pivot axis A2. When the upright, folded position of equipment carrier mounting portion 28 is reached, the biasing force on retainer bar 144 applied by spring 134 functions to move the ends of retainer bar 124 into the upper detents 76a. In this manner, the equipment carrier mounting portion 128 is maintained in an upright position while mounting arrangement 20 remains engaged with the vehicle. The above-described steps are reversed when it is desired to return the equipment carrier mounting portion 28 to the lowered, operative position or the tilt position.

When the user wishes to remove the equipment carrier from the vehicle, the user first ensures that the equipment carrier mounting portion 28 is in the lowered, operative position as described above. The user then operates lock assembly 97 so as to disengage T-shaped lock member 99 from its engagement with locking bracket 56. The user then pivots retainer member 86 to its open, release position so as to remove the ends of locking bar 94 from the space between retainer edges 130 of hub assembly sidewalls 64 and retainer edges 132 of actuator housing sidewalls 78. With retainer member 86 in the open, release position, the user is able to apply an upward and forward force on equipment carrier mounting portion 28, so as to enable equipment carrier mounting portion 28 and hub assembly 26 to be pivoted upwardly and forwardly about the pivot axis A1 between hub assembly 26 and actuator housing 34. Such pivoting movement of hub assembly 26 functions to move operator assembly 38 and locking bar 40 forwardly. The side walls of mounting bar 22 are provided with aligned openings, and a rivet 134 is positioned within the aligned openings. The rivet 134 is positioned below the locking bar 40, and prevents downward deflection of locking rod 40 which otherwise may result from the forward advancement of locking rod 40. The forward movement of locking bar 40 advances locking wedge 42 forwardly within wedge opening 128, so as to move the locking surfaces of locking wedge 42 inwardly and out of locking engagement with the inner walls of hitch receiver 30. The user can then apply a rearward force on the entire mounting arrangement 20 and its equipment supporting components so as to withdraw mounting bar 22 from the hitch receiver 30.

Figure 10:
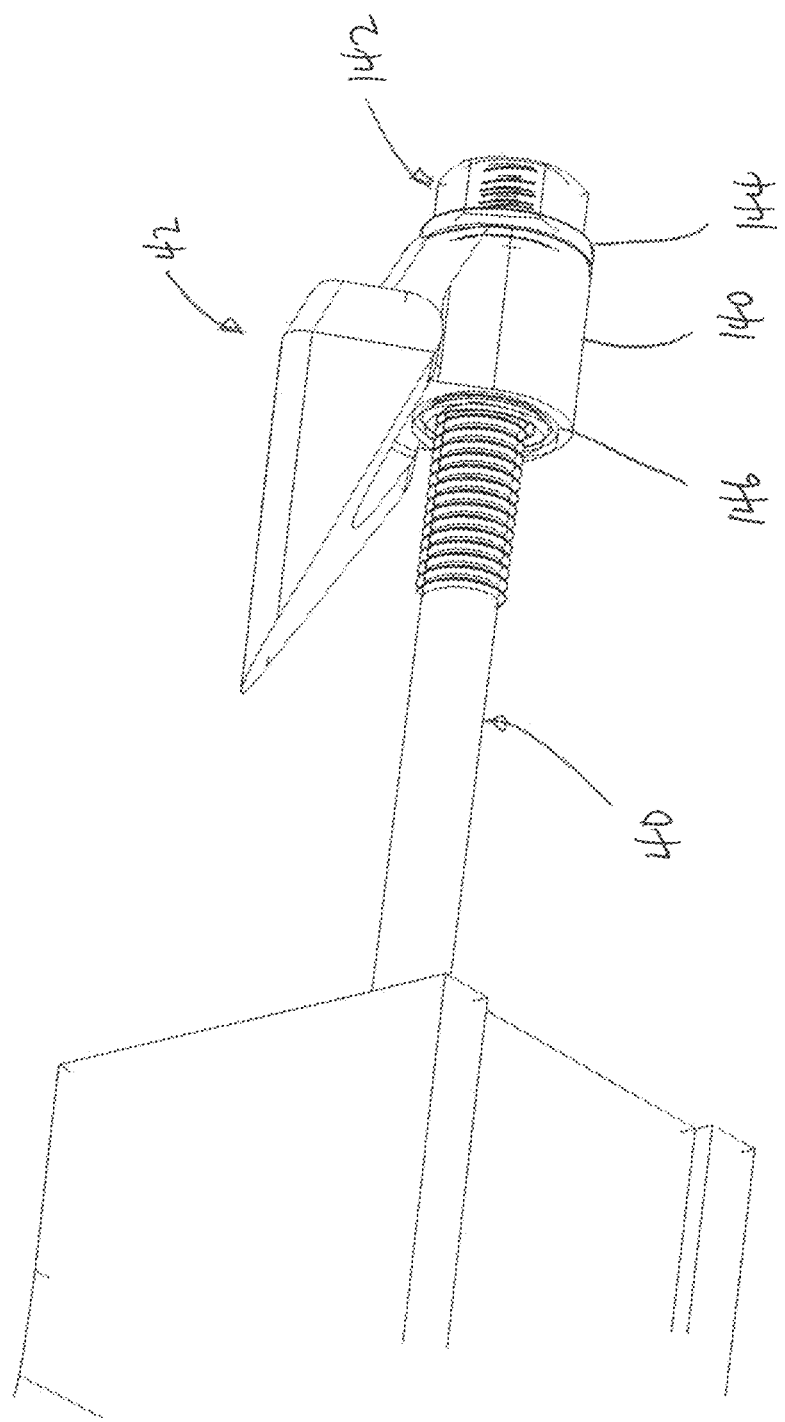
FIG. 10 is an enlarged partial isometric view of a wedge component incorporated into the mounting arrangement of FIGS. 1-9 and as illustrated in FIG. 6.
Figure 11:
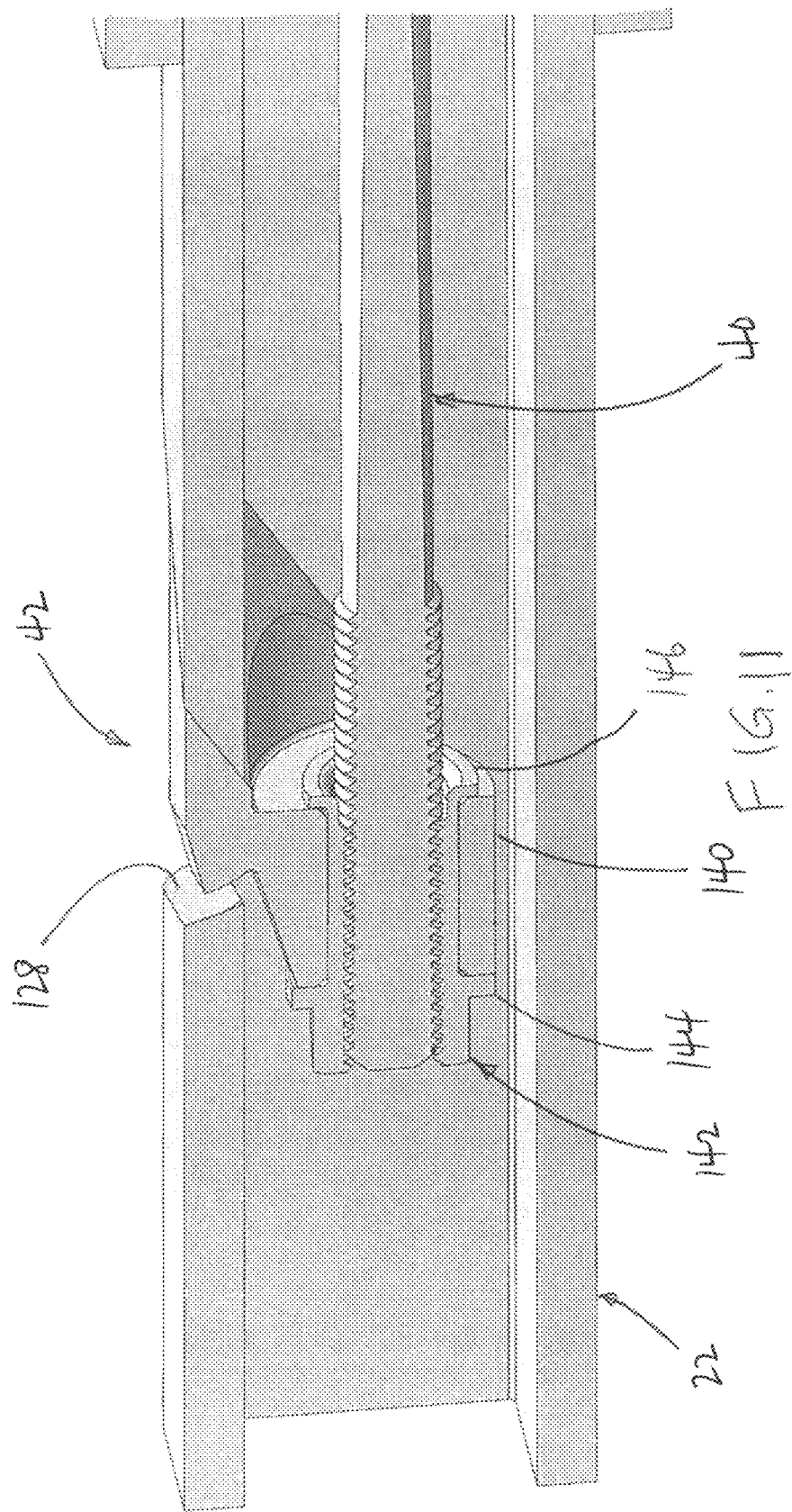
FIG. 11 is a partial section view illustrating the wedge component of FIG. 10 as contained within a mounting bar incorporated into the mounting arrangement, as illustrated in FIG. 6.

FIGS. 10 and 11 illustrate a detail that may be incorporated in the interconnection of locking wedge 42 with locking rod 40. As shown, the locking wedge 42 may be formed with a hub 140. The hub 140 is formed with an axial passage therethrough, and an internally threaded adjustment bushing 142 is positioned within the axial passage of hub 140. The adjustment bushing 142 is provided with a rear flange 144 positioned adjacent the rearward end of hub 140, and a front flange 146 positioned adjacent the front end of hub 140. The axial passage of hub 140 and the cylindrical body of adjustment bushing 142 between rear and front flanges 144, 146, respectively, are configured such that adjustment bushing 142 can be rotated relative to hub 140. The rearward end of adjustment bushing 142 has a series of planar engagement surfaces configured as a nut, to provide engagement with a tool such as a driving socket. The internal passage of adjustment bushing 142 has internal threads configured to engage external threads formed at the rearward end of locking rod 40. With this arrangement, the user is able to use a socket wrench or the like to rotate adjustment bushing 142 relative to locking rod 40, which can provide either forward or rearward movement of locking wedge 42 relative to locking rod 40. This provides an adjustment feature that can accommodate different manufacturing tolerances that may be encountered in the internal walls of hitch receiver 30, or the presence of corrosion or other materials that may be present and that may affect the dimensions of the hitch receiver passage.

FIGS. 12-19 illustrate another embodiment of a mounting arrangement in accordance with the present invention, shown at 150. Mounting arrangement 150 is configured for securing an equipment carrier having an upright member 152 to the hitch receiver 30 of a vehicle. An equipment carrier of this type may be configured to carry bicycles in a suspended manner, or alternatively any other type of support structure may be secured to the upper end of upright member 152 to carry other types of equipment in any desired manner.

Similar to mounting arrangement 20 described previously, mounting arrangement 150 includes a mounting bar 154 that is configured to be received within the internal passage of hitch receiver 30. The mounting bar 154 itself defines an internal passage, and has sidewalls that define a wedge opening 156 (similar to the previously-described wedge opening 128) within which a locking wedge 158 is positioned.

A main bracket assembly 160 is secured to the rearward end of mounting bar 154. The main bracket assembly 160 includes a pair of bracket sidewalls 162. Upper and lower bracket walls 164, 166, respectively, extend between the forward ends of bracket sidewalls 162, and cooperate to define a passage corresponding in shape to the external dimensions of mounting bar 154, to enable mounting bar 154 to be engaged with and secured to bracket assembly 160. The rearward edge of each bracket sidewall 162 is provided with a notch 168, and is formed so as to provide an upwardly facing stop surface 170. Each bracket sidewall 162 is further provided with an opening 172.

An upright member mounting bracket assembly 174 is secured to the lower end of upright member 150, and is positioned between bracket sidewalls 162. The mounting bracket assembly 174 includes a pair of bracket members 176, each of which is provided with a rearward mounting portion 178. The rearward mounting portions 178 of bracket members 176 are configured to receive the lower end of upright member 152 therebetween, to provide a rigid securement of upright member 152 to upright member mounting bracket assembly 174. It is understood, however, that upright member 152 may be interconnected with bracket assembly 174 in any other satisfactory manner.

Figure 12:
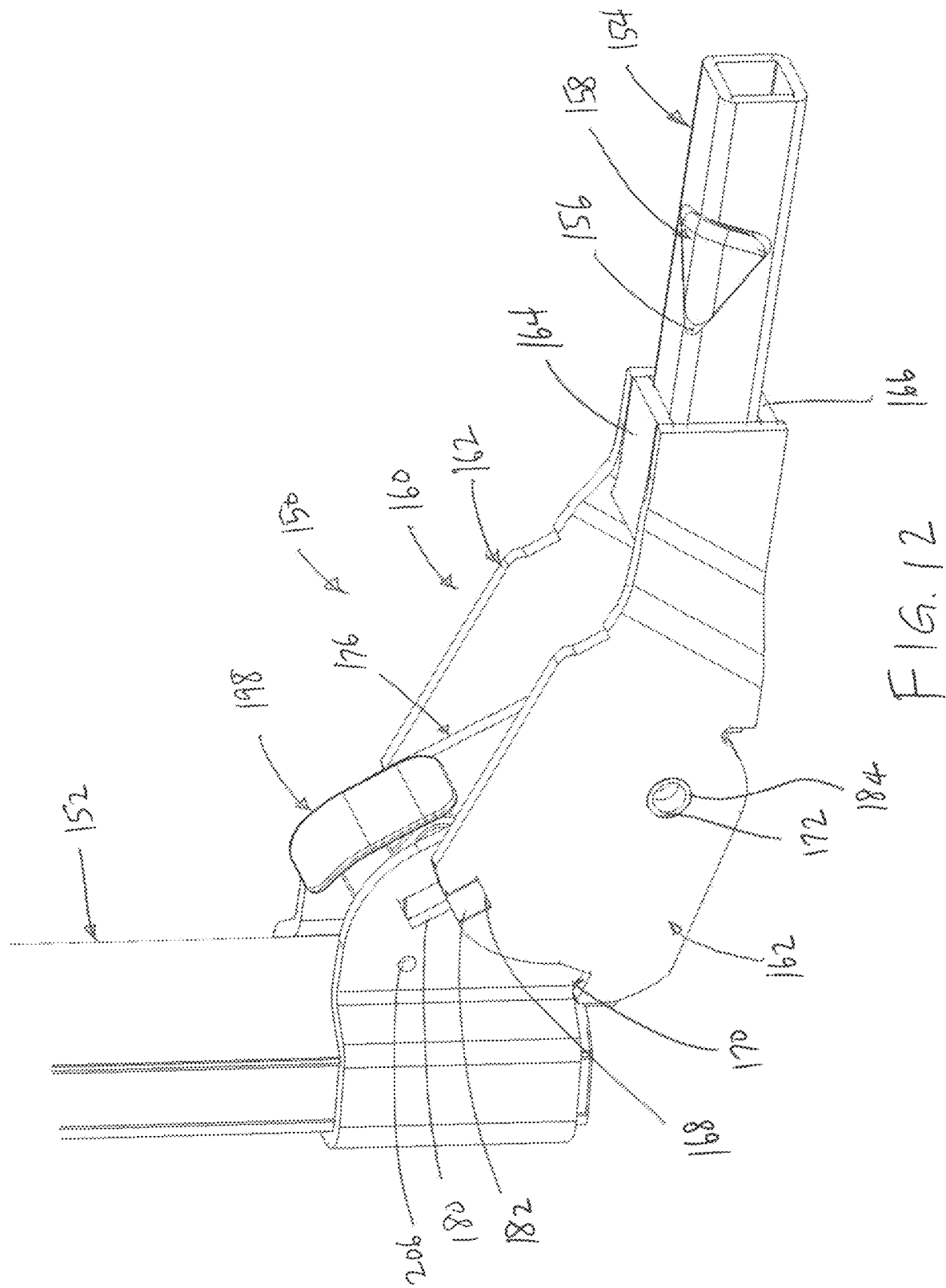
FIG. 12 is a partial isometric view of a second embodiment of a mounting arrangement for a hitch-mounted equipment carrier in accordance with the present invention.
Figure 13:
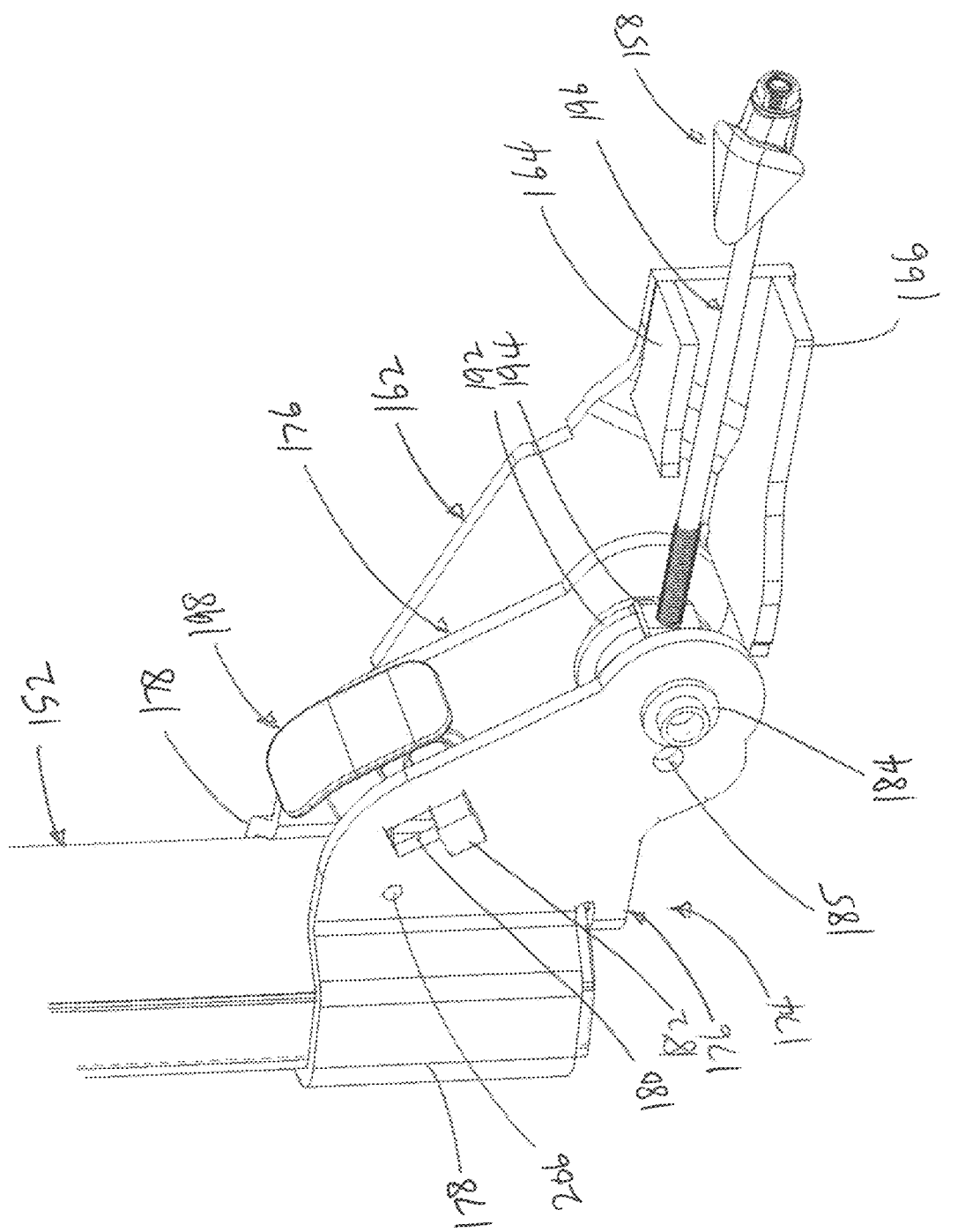
FIG. 13 is a partial isometric view similar to FIG. 12, with certain components removed.

As shown in FIG. 13, each bracket member 176 of mounting bracket assembly 174 is provided with an angled slot 180 toward its upper end. A locking bar 182 extends between the bracket members 176, with the end portions of the locking bar 182 being positioned within the slots 180 of bracket members 176. A bushing 184 is secured to the forward end of each bracket member 136 so as to extend outwardly therefrom, and the end portion of each bushing 184 is configured to be engaged within the opening 172 in the adjacent bracket sidewall 162 (as shown in FIG. 12). In this manner, mounting bracket assembly 174 is pivotable relative to main bracket assembly 160 about a pivot axis defined by the bushings 184. An opening 185 is formed in each bracket member 136 adjacent each bushing 184.

Figure 14:
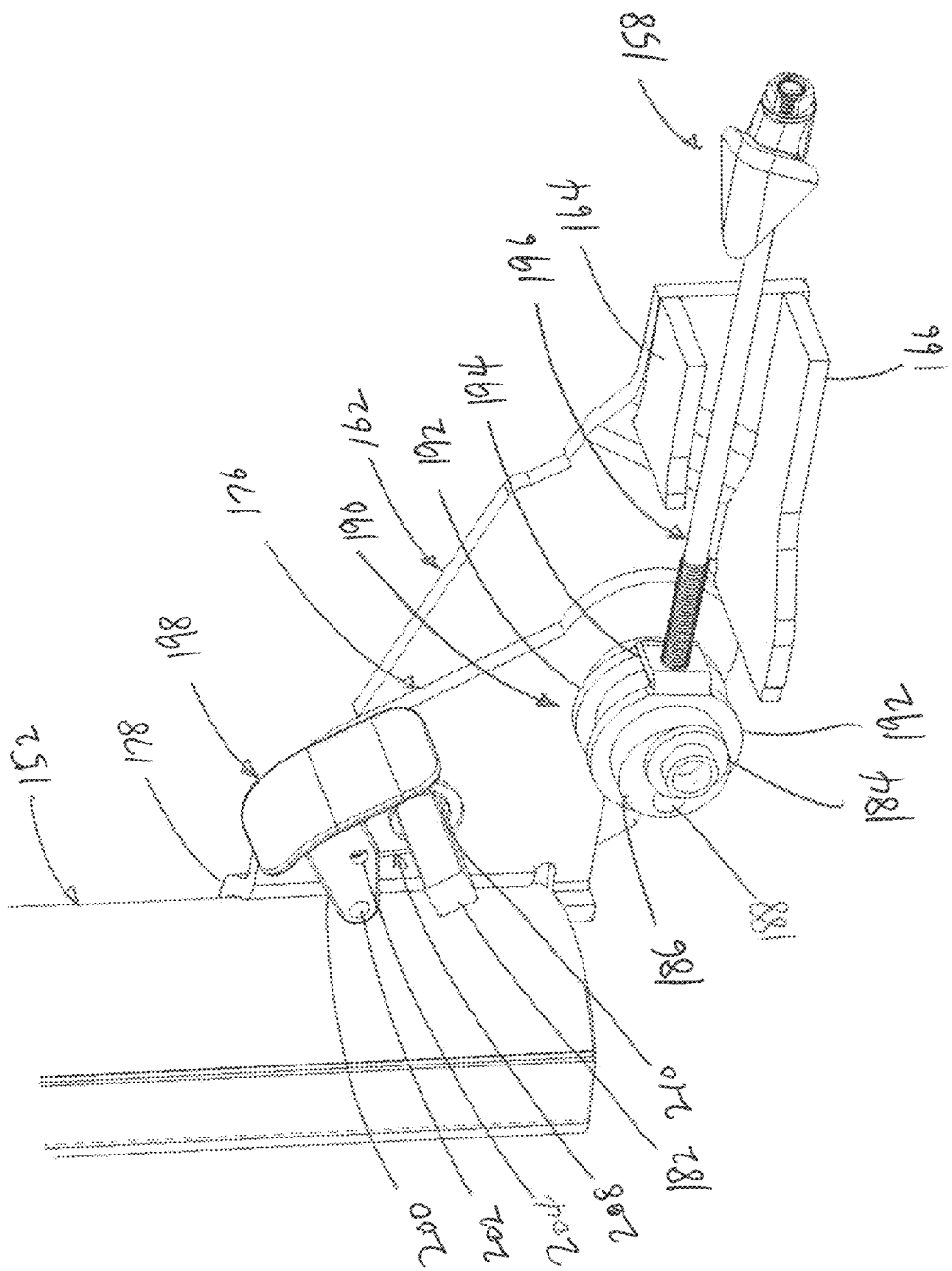
FIG. 14 is a partial isometric view similar to FIGS. 12 and 13, with certain additional components removed.
Figure 15:
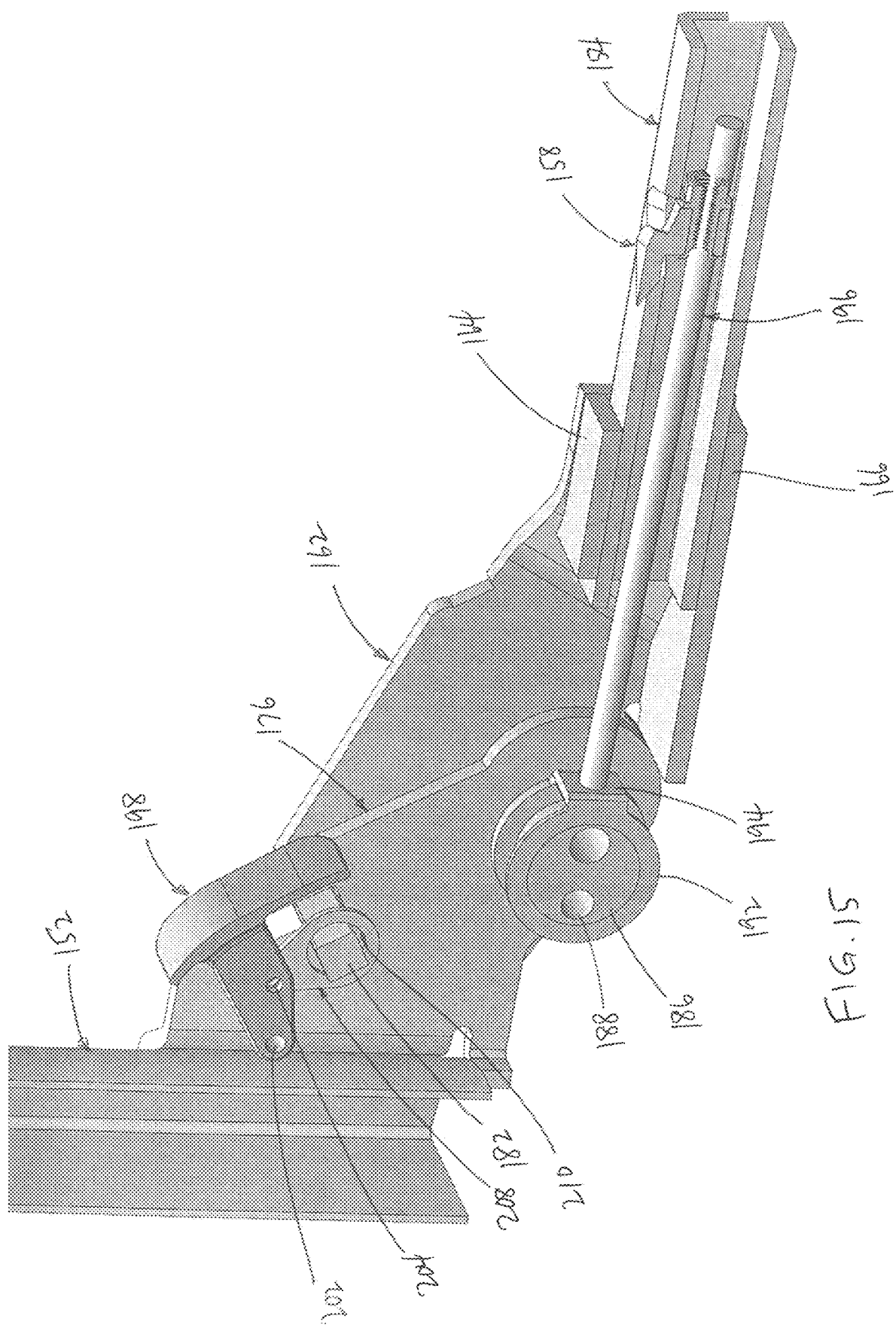
FIG. 15 is a partial section view showing internal components of the mounting arrangement of FIGS. 12-14.

Referring to FIGS. 13-15, each bushing 184 extends outwardly from the end of a block 186. The block 186 has a circular cross-section, and each end surface of block 186 is provided with an inwardly extending passage 188. The passage 188 in block 186 is positioned in alignment with the passage 185 in bracket member 176, and a pin is adapted to be inserted into the aligned passage 188 and opening 185, so as to non-rotatably secure block 186 between bracket members 176.

A ring-type bracket 190 is positioned about block 186. The ring-type bracket 190 includes a pair of ring members 192 between which a mounting boss 194 extends. The mounting boss 194 is provided with a threaded passage, and external threads provided at the end of a locking rod 196 engage the rearward end of locking rod 196 with the mounting boss 194. The locking wedge 158 is secured to the forward end of locking rod 196 as described previously.

An actuating lever 198 is positioned between the bracket members 176 above slots 180. The actuating lever 198 includes a mounting arm 200, which is provided with a rearward opening 202 and a forward opening tool 204. The actuating lever 198 is pivotably mounted to bracket members 176 by a pivot pin that extends through rearward opening 202 and is engaged within aligned openings 206 formed in bracket members 176. A lift member 208 is pivotably mounted to the mounting arm 200 of actuating lever 198 via a pivot pin that extends through the opening 204 and an aligned opening in the upper end area of lift member 208. The lift member 208 defines an opening 210 through which the locking bar 182 extends.

Figure 16:
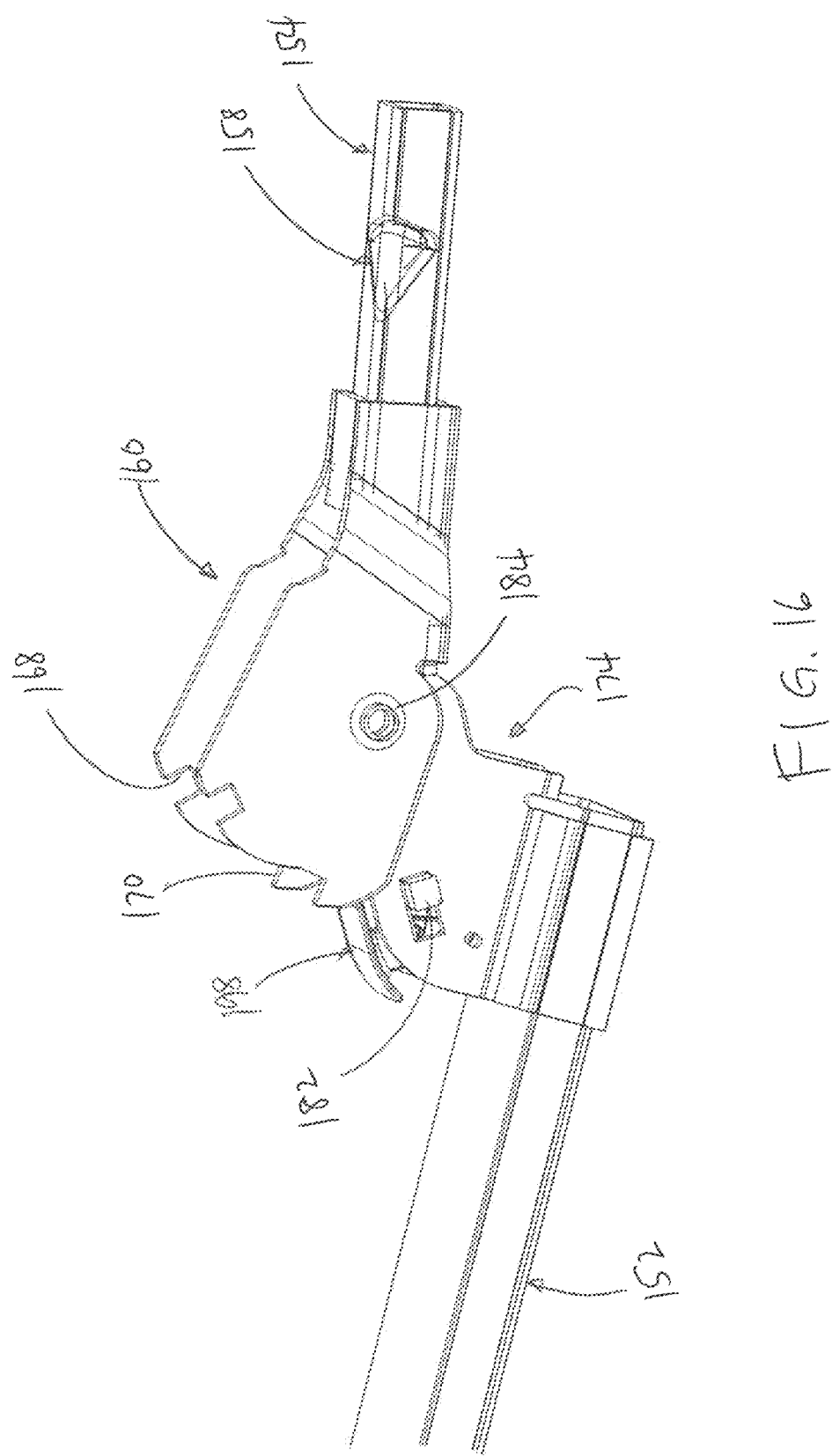
FIG. 16 is an isometric view similar to FIG. 12, showing the mounting arrangement in an inoperative position.
Figure 17:
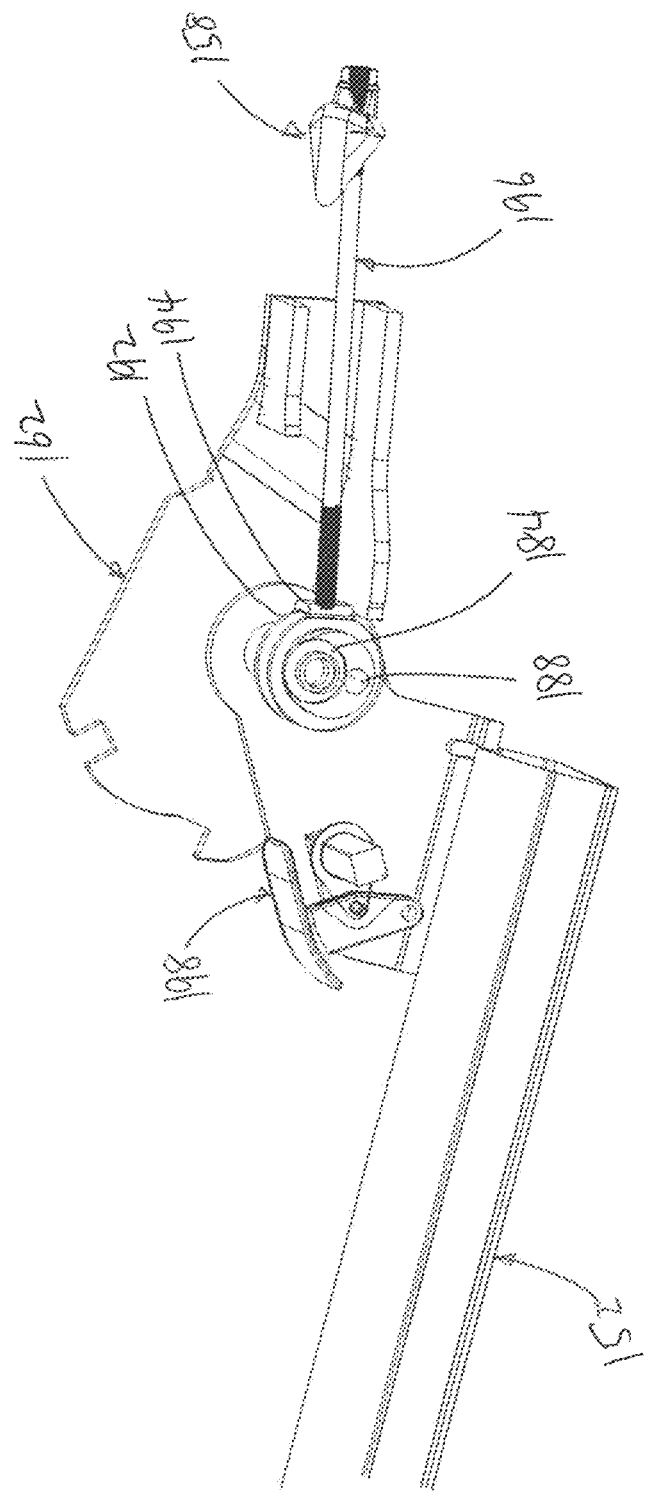
FIG. 17 is a section view of the mounting arrangement as shown in FIG. 16.

In operation, the mounting arrangement 150 functions as follows. Initially, the actuating lever 198 is engaged by a user and pivoted upwardly, so as to move locking bar 182 fully upwardly within slots 180 of bracket members 176. With locking bar 182 in this position, the upright member mounting bracket assembly 174 can be pivoted relative to the main bracket assembly 160 about a pivot axis defined by bushings 184 to a fully reclined, inoperative position as shown in FIGS. 16 and 17. Due to the positioning of passages 188 in block 186, this position of mounting bracket assembly 174 places locking bar 182, and thereby locking wedge 158, in a forwardmost position within wedge opening 156. With locking wedge 158 in this forwardmost position, the mounting bar 154 can be inserted into the passage of hitch receiver 130 without obstruction by locking wedge 158.

Once the mounting bar 154 is fully inserted into the passage of hitch receiver 130, the user applies an upward force on upright member 152, which causes upward (clockwise) rotation of mounting bracket assembly 174 relative to main bracket assembly 160. As mounting bracket assembly 174 is pivoted upwardly relative to main bracket assembly 160 in this manner, block 186 is rotated about the pivot axis defined by bushings 184. Due to the offset of the pins received within the block passages 188 and openings 185, such rotation of block 186 functions to draw locking rod 196 rearwardly, thus causing rearward movement of locking wedge 158 within wedge opening 156. As described previously with respect to mounting arrangement 20, such rearward advancement of locking wedge 158 within wedge opening 156 functions to lock the mounting bar 154 into the passage of hitch receiver 30. The user continues movement of upright member 152 to the fully upright position, at which point locking bar 182 comes into alignment with notches 168 of main bracket sidewalls 162, and is engaged therein under the force of gravity, to maintain the upright position of mounting bracket assembly 154, and thereby upright member 152, relative to main bracket assembly 160.

Figure 18:
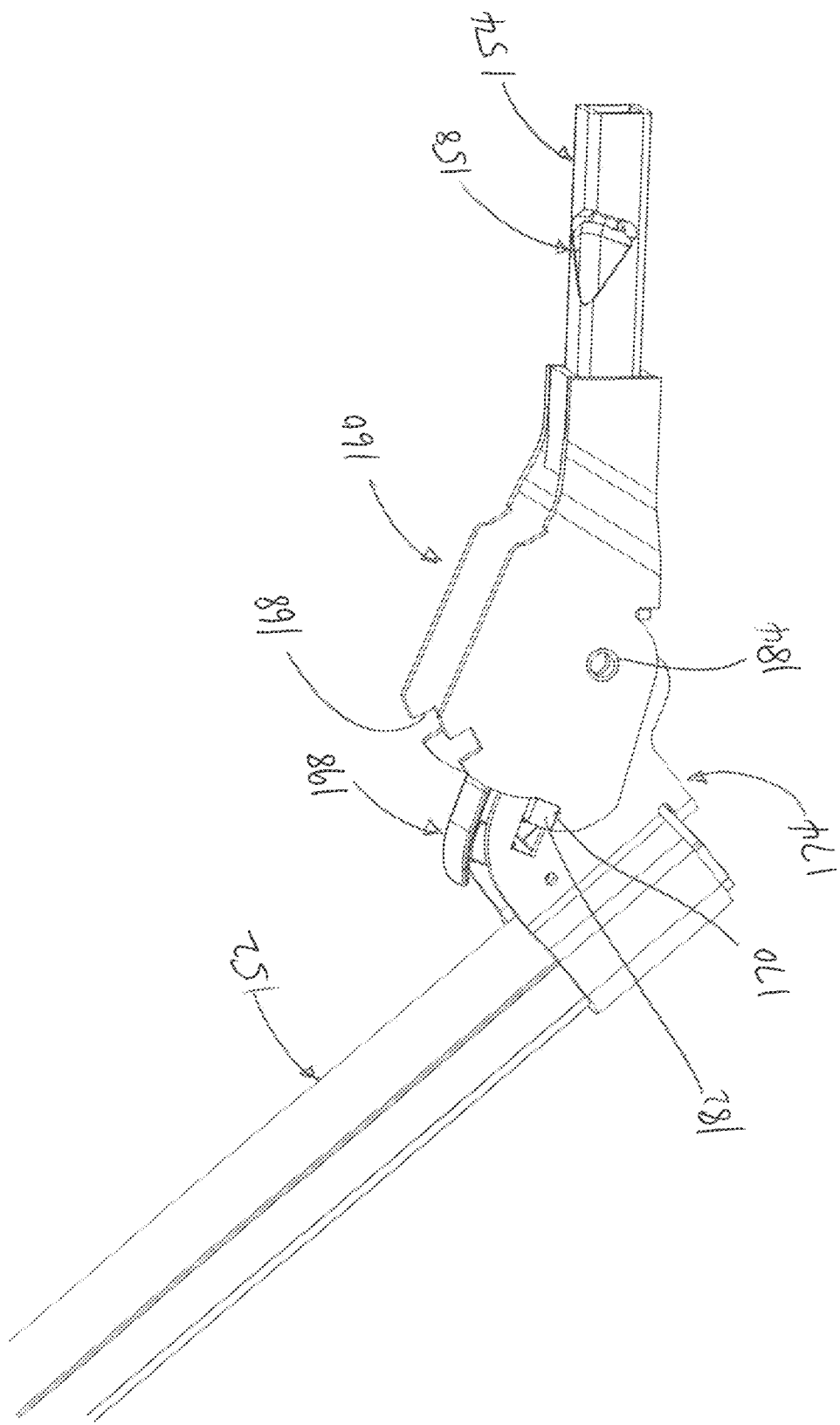
FIG. 18 is an isometric view similar to FIGS. 12 and 16, showing the mounting arrangement in a tilt position.
Figure 19:
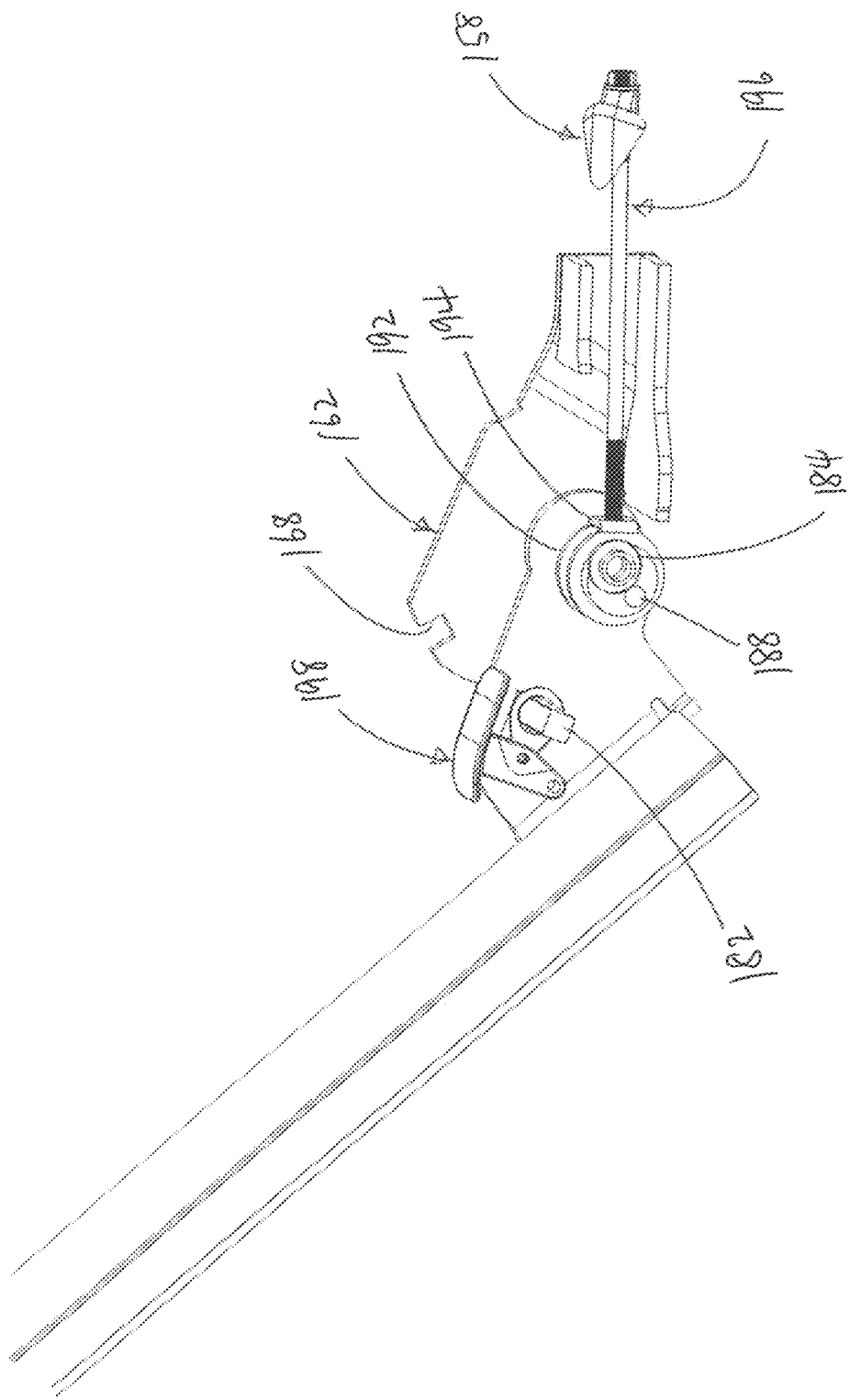
FIG. 19 is a section view of the mounting arrangement as shown in FIG. 18.

If the user wishes to gain access to the rear of the vehicle while mounting arrangement 150 is in engagement with the hitch receiver 30, the user manually lifts actuating lever 198 so as to disengage locking bar 182 from the main bracket notches 168. Upright member 152 can then be pivoted rearwardly to a tilt position as shown in FIGS. 18 and 19. In this position, the locking bar 182 engages the main bracket sidewall stop surfaces 170, to prevent further movement of upright member mounting bracket assembly 174 to the fully inoperative, reclined position of FIGS. 16 and 17. In the tilt position as shown in FIGS. 18 and 19, there is a slight degree of movement of locking wedge 158 inwardly relative to the inside walls of the hitch receiver 30. However, such inward movement of locking wedge 158 is insufficient to fully disengage locking wedge 158, so that mounting bar 154 remains secured to hitch receiver 30 against rearward movement. This relatively slight inward movement of locking wedge 158 is accomplished by the positioning of passages 188 in block 186 relative to the pivot axis of block 186. That is, a greater degree of forward movement of locking rod 196 is accomplished by movement from the tilt position to the fully reclined position than is accomplished by movement from the upright position to the tilt position.

Figure 20:
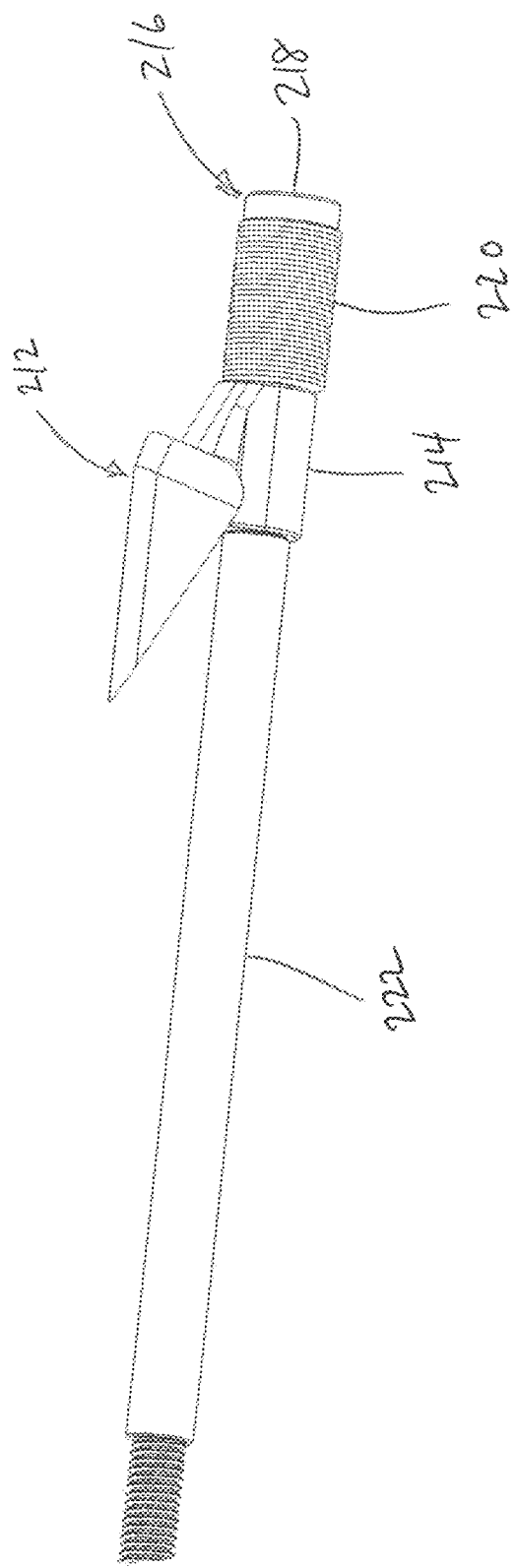
FIG. 20 is a partial isometric view illustrating an alternative embodiment of an assembly including the wedge component as contained within the mounting bar incorporated into the mounting arrangement.

FIG. 20 illustrates an alternative interconnection that may be provided between a locking rod and a locking wedge that may be incorporated into either of the above-described mounting arrangement embodiments, but which may be particularly suitable for the embodiment illustrated in FIGS. 12-19. In this interconnection, the locking wedge, shown at 212, may be provided with a hub 214 that defines an internal passage therethrough. A screw 216 has a threaded shank that extends through the passage in hub 214 and that extends outwardly from the forward end of the hub 214. The screw has a head 218 at its rearward end, and a spring 220 is positioned between the screw head 218 and the rearward end of hub 214. The locking rod incorporates a sleeve 222 having internal threads that are engageable with the threads at the forward end of the shank of screw 216. With this arrangement, the spring 220 provides a spring cushion between the locking rod and the locking wedge 212, while urging the wedge 212 forwardly within the wedge opening such as 156 and thus into engagement with the inner surfaces of hitch receiver 30.

It can thus be appreciated that the present invention provides a mounting arrangement for a vehicle-mounted equipment carrier that includes a number of advantages in automatically securing the carrier to the hitch receiver when the carrier is placed in an operative position, while including provisions for enabling the carrier to be moved to a tilt or reclined position while remaining in engagement with the hitch receiver.

It should also be understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. An equipment carrier adapted to be secured to a vehicle-mounted hitch receiver having a series of walls defining an axially extending internal passage, comprising: a mounting bar having a first end configured to be positioned within the internal passage of the hitch receiver; a locking member carried by the first end of the mounting bar; an equipment carrier pivotably interconnected with a second end of the mounting bar for movement about a main pivot axis, wherein the equipment carrier is pivotable between an inoperative position and an operative position, wherein the locking member is movable from a disengaged position to an engaged position in response to movement of the equipment carrier from the inoperative position toward the operative position, wherein in the engaged position the locking member engages one of the walls of the hitch receiver so as to secure the mounting bar within the passage of the hitch receiver and prevent withdrawal of the mounting bar from the hitch receiver passage; wherein an equipment carrying portion of the equipment carrier includes an actuator assembly, wherein the actuator assembly is engaged in a first engaged position when the equipment carrying portion of the equipment carrier is in the operative position, and is engaged in a second engaged position when the equipment carrying portion is moved away from the operative position to a tilt position, wherein the locking member of the equipment carrier remains in the engaged position in which the locking member engages one of the walls of the hitch receiver during movement of the equipment carrying portion between the operative position and the tilt position.

2. The equipment carrier of claim 1, further comprising a retainer arrangement interposed between the mounting bar and the equipment carrier for selectively preventing pivoting movement of the equipment carrier about the main pivot axis.

3. The equipment carrier of claim 2, wherein the equipment carrying portion of the equipment carrier is pivotable about a second pivot axis spaced from the main pivot axis, wherein the actuator assembly is configured to selectively prevent pivoting movement of the equipment carrying portion about the second pivot axis while permitting pivoting movement of the equipment carrier about the main pivot axis.

4. The equipment carrier of claim 3, wherein the equipment carrying portion of the equipment carrier is pivotable about the second pivot axis from the operative position to the tilt position in a first direction, and is further pivotable about the second pivot axis from the operative position to a folded position in a second direction opposite the first direction.

\* \* \* \* \*